(12) United States Patent
Matsuno et al.

(10) Patent No.: US 7,430,688 B2
(45) Date of Patent: Sep. 30, 2008

(54) NETWORK MONITORING METHOD AND APPARATUS

(75) Inventors: Akinori Matsuno, Yokohama (JP);
Masayuki Takeda, Yokohama (JP);
Masayuki Hasegawa, Yokohama (JP);
Hirofumi Kitagawa, Yokohama (JP);
Toshimitsu Handa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 11/004,000

(22) Filed: Dec. 3, 2004

(65) Prior Publication Data
US 2006/0085680 A1    Apr. 20, 2006

(30) Foreign Application Priority Data
Sep. 24, 2004    (JP)    ............................. 2004-277574

(51) Int. Cl.
*G06F 11/00*    (2006.01)
(52) U.S. Cl. ........................ 714/31; 709/224
(58) Field of Classification Search .................. 714/31, 714/43; 709/224, 208
See application file for complete search history.

(56) References Cited

U.S. PATENT DOCUMENTS

| | | | |
|---|---|---|---|
| 6,324,161 B1 * | 11/2001 | Kirch | 370/217 |
| 6,343,320 B1 * | 1/2002 | Fairchild et al. | 709/224 |
| 6,633,538 B1 * | 10/2003 | Tanaka et al. | 370/222 |
| 2005/0256935 A1 * | 11/2005 | Overstreet et al. | 709/208 |

FOREIGN PATENT DOCUMENTS

JP    2001-28586    1/2001

* cited by examiner

*Primary Examiner*—Gabriel L Chu
(74) *Attorney, Agent, or Firm*—Katten Muchin Rosenman LLP

(57) ABSTRACT

A network monitoring method and system reduces a load to a monitoring network without deteriorating accuracy of detecting a malfunction. A plurality of network constituent elements that constitute a communication network are connected to an operation system through a monitoring network. A health check for detecting a malfunction is periodically performed between a group of the network constituent elements positioned closed to each other within the communication network at a short monitoring period. A health check of malfunction detection on all of the network constituent elements is performed by the operation system at a long monitoring period longer than the short monitoring period.

9 Claims, 24 Drawing Sheets

NETWORK MONITORING METHOD AND APPARATUS

BACKGROUND OF THE INVENTION

1. Field of the Invention

The present invention generally relates to a network monitoring technique and, more particularly, to a network monitoring method for monitoring and controlling network constituent elements, such as a transmission apparatus and a router, using an operation system, and a network monitoring apparatus performing such a network monitoring method.

2. Description of the Related Art

Conventionally, network structural elements such as a transmission apparatus and a router that constitute a communication network are monitored and controlled by an operation system.

FIG. 1 is an illustration for explaining an example of a conventional network monitoring method. In FIG. 1, transmission apparatuses 10a1, 10a2 and 10a3 and routers 12a, 12b and 12c, each of which is a network constituent element, constitute a communication network. The routers 12a, 12b and 12c are connected to a monitoring network 14 such as a WAN or LAN. An operation system 16 is connected to the monitoring network 14 through a router 12d.

The operation system 16 comprises a client system, which receives requests of services such as monitoring and controlling from an operator, and a server system, which executes service requests received by the client system. The operation system 16 monitors and controls the transmission apparatuses 10a1, 10a2 and 10a3 and the routers 12a, 12b and 12c.

The operation system 16 performs a health check or polling using the ping periodically (for example, every 60 seconds) on each of the transmission apparatuses 10a1, 10a2 and 10a3 and the routers 12a, 12b and 12c that are under management of the operation system 16. Each of the transmission apparatuses 10a1, 10a2 and 10a3 sends a trap to the operation system 16 to notify occurrence of an abnormality when detecting the abnormality of its own. However, such a notification is not made in cases of a communication disconnection of the monitoring network 14, a power supply disconnection of a transmission apparatus, a malfunction of a trap sending part, etc.

It should be noted that Japanese Laid-Open Patent Application No. 2001-28586 discloses a means for constituting one or a plurality of virtual terminals each of which has a physical address and a communication address, and a means for testing one or a plurality of network apparatuses to be tested by simulating an FTP file transfer of TCP/IF and an ICMP-ECHO communication by a virtual terminal.

With the recent improvement in performance of CPUs, a number of transmission apparatuses to be monitored and controlled by one operation system tends to increase. On the other hand, there are many cases in which a monitoring network is not updated even if a number of monitoring and transmission apparatuses is increased since it takes an extremely large cost to update the monitoring network as an infrastructure.

Moreover, as for a method of monitoring from an operation system, detection of malfunction information of a transmission apparatus is performed by a trap from the transmission apparatus and a health check and polling from the operation system. However, since the trap from a transmission apparatus does not reach the operation system when communication through the monitoring network is disconnected, the health check and polling from the operation system are indispensable for monitoring the transmission apparatus.

In such a case, in order to detect immediately an occurrence of a malfunction and recovery thereof, it is necessary to perform a health check or polling at a short period, which increases a load to a monitoring network with an increase in a number of transmission apparatuses.

SUMMARY OF THE INVENTION

It is a general object of the present invention to provided a network monitoring method and apparatus in which the above-mentioned problems are eliminated.

A more specific object of the present invention is to provide a network monitoring method and system which reduces a load to a monitoring network without deteriorating accuracy of detecting a malfunction.

In order to achieve the above-mentioned objects, there is provided according to one aspect of the present invention a network monitoring method for monitoring a plurality of network constituent elements that constitute a communication network by being connected to an operation system through a monitoring network, the network monitoring method comprising periodically performing a health check of a malfunction detection between a group of the network constituent elements positioned closed to each other within the communication network at a first monitoring period.

The network monitoring method according to the present invention may further comprise periodically performing a health check of malfunction detection on all of the network constituent elements by the operation system at a second monitoring period longer than the first monitoring period. The group of the network constituent elements positioned close to each other may be a group of network constituent elements connected to a router at an end of the monitoring network.

In the above-mentioned network monitoring method, when a malfunction occurs in the router at the end of the monitoring network, the operation system may stop the health check on the network constituent elements managed by the router. When the malfunction of the router at the end of the monitoring network is recovered, the operation system may resume the health check on the network constituent elements managed by the router.

In the network monitoring method according to the present invention, the operation system may stop the health check on one of the network constituent elements in which a malfunction occurs. One of the network constituent elements, which detects a malfunction by the health check between the group of the network constituent elements, may notify the operation system of the malfunction by repeatedly sending malfunction information by a trap. The operation system may request, upon receipt of the trap, a stop of sending the trap to the one of the network constituent elements which sent the trap. The health check to be performed by the one of the network constituent elements in which the malfunction occurs may be performed by one of the network constituent elements in the same group, which has no malfunction.

In the network monitoring method according to the present invention, when a malfunction occurs in one of the group of the network constituent elements which performs the health check that was supposed to be performed by the one of the constituent elements in which the malfunction occurs, the operation system may resume the health check on the one of the network constituent elements in which the malfunction occurs. When a number of the network constituent elements on which one of the constituent elements performs the health check exceeds a predetermined number, the operation system may resume the health check on all of the network constituent elements included in the same group.

Additionally, there is provided according to another aspect of the present invention an operation system for monitoring a plurality of network constituent elements that constitute a communication network by being connected to each of the network constituent elements through a monitoring network, the operation system comprising a first monitoring means which causes a health check of a malfunction detection between a group of the network constituent elements positioned closed to each other within the communication network at a first monitoring period.

The operation system according to the present invention may further comprise a second monitoring means that periodically performs a health check of malfunction detection on all of the network constituent elements at a second monitoring period longer than the first monitoring period.

According to the above-mentioned present invention, a load to a monitoring network can be reduced without deteriorating accuracy of malfunction detection even if a number of network constituent elements, which constitute a communication network, is increased.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments of the present invention.

FIG. 2 through FIG. 6 are illustrations for explaining a principle of the present invention.

Figure 1:
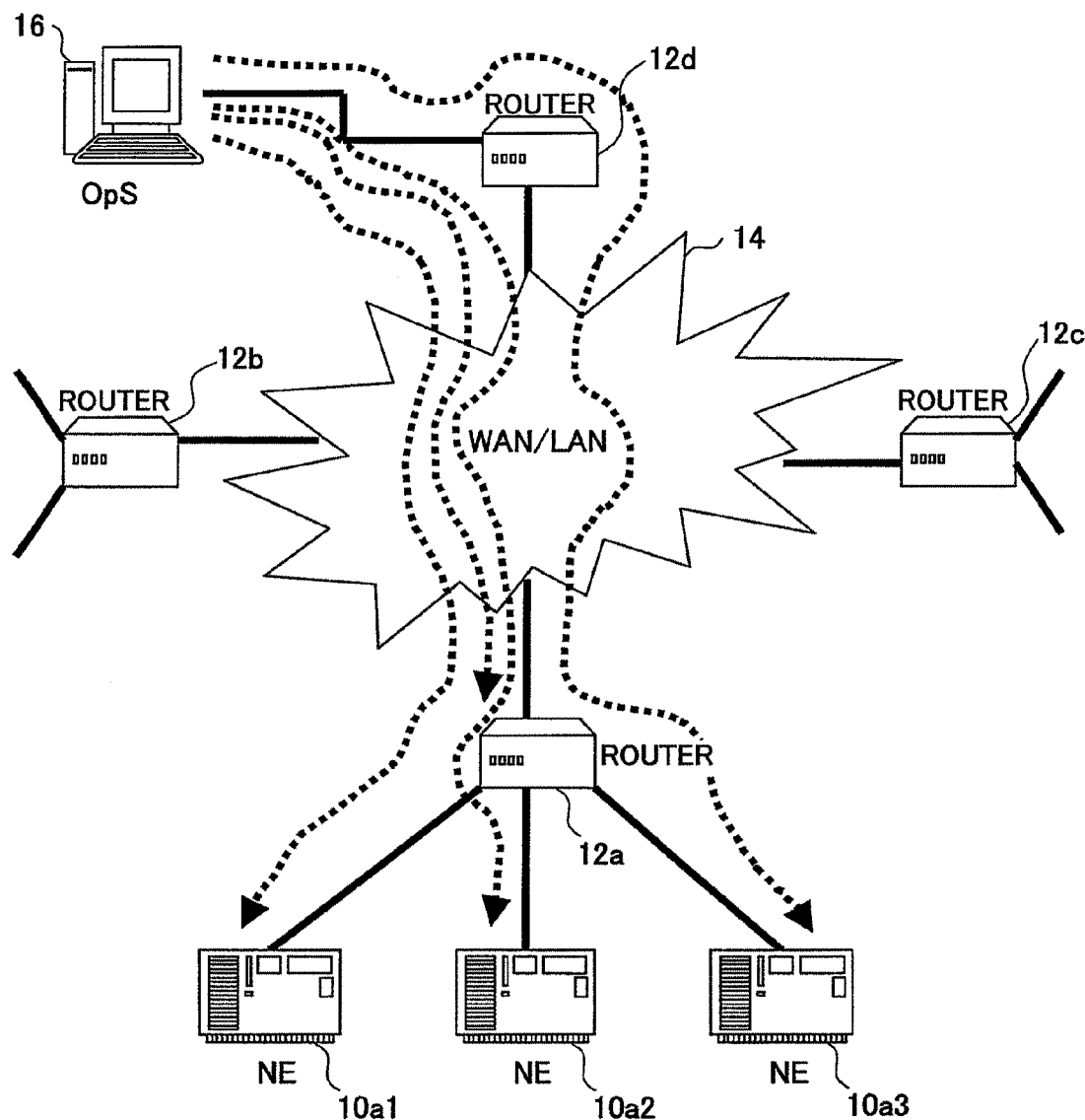
FIG. 1 is an illustration for explaining an example of a conventional network monitoring method.
Figure 2:
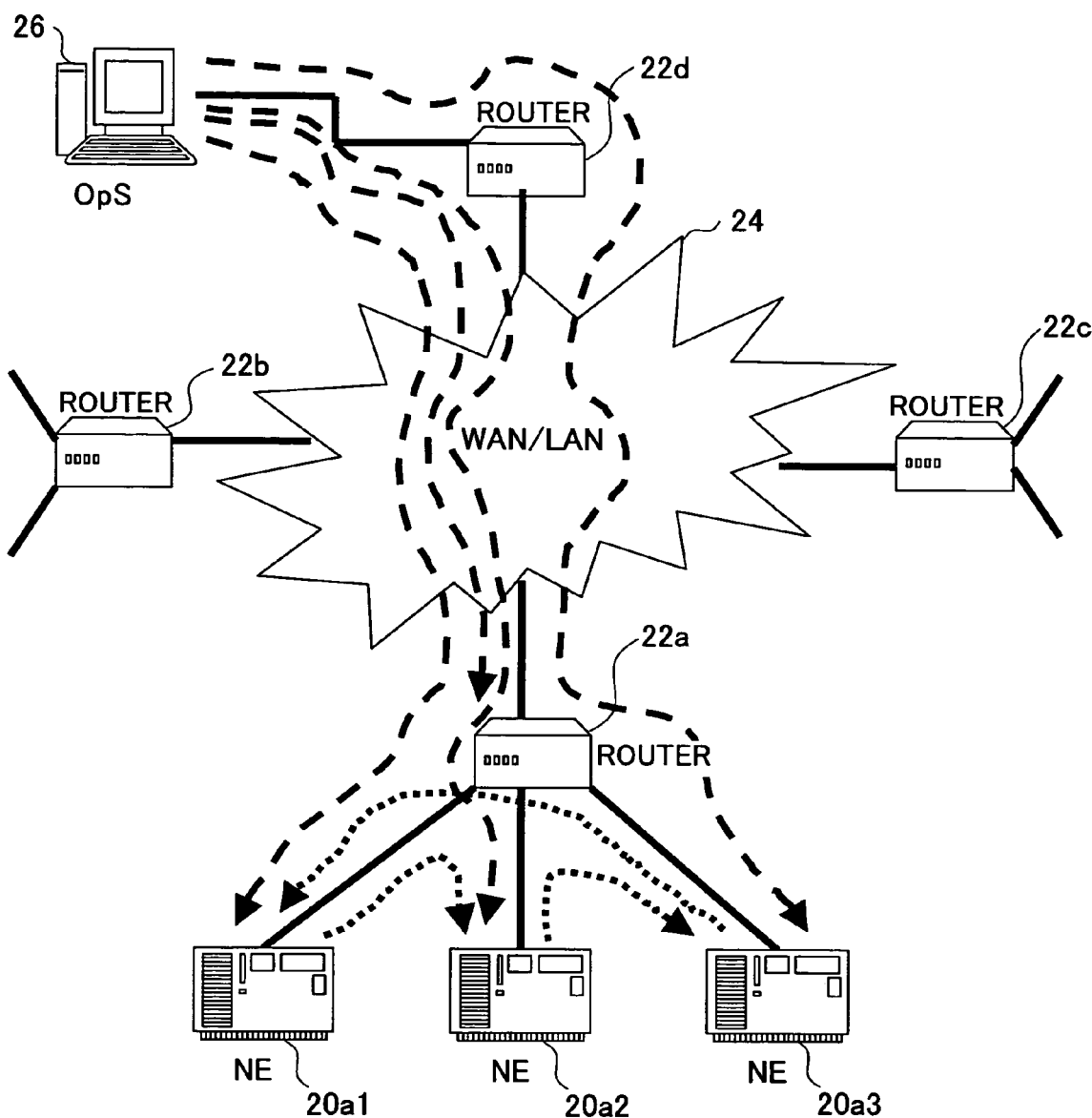
FIG. 2 is an illustration for explaining a principle of the present invention.

In FIG. 2, a communication network is constituted by transmission apparatuses (NE) $20a1$, $20a2$ and $20a3$ and routers $22a$, $22b$ and $22c$, which are network constituent elements. The routers $22a$, $22b$ and $22c$ are connected to a monitoring network 24 such as a WAN or a LAN. An operation system 26 is connected to the monitoring network through a router $22d$. The operation system 26 comprises a client system, which receives a request of services such as monitoring or controlling from an operator, and a server system, which executes the service request received by the client system so as to monitor and control the transmission apparatuses $20a1$, $20a2$ and $20a3$ and the routers $22a$, $22b$ and $22c$.

(1) The operation system 26 periodically performs a health check on each of the transmission apparatuses $20a1$, $20a2$ and $20a3$ and the routers $22a$, $22b$ and $22c$ at a monitoring period longer than that of the conventional system. Additionally, a health check is periodically performed between a plurality of the transmission apparatuses that are located close to each other within the communication network (for example, transmission apparatuses connected to one router) at a monitoring period (for example, 10 seconds) shorter than that of the conventional system. When a malfunction is detected by the health check between the transmission apparatuses, the transmission apparatus, which detected the malfunction, sends a trap to the operation system 26.

It should be noted that the health check is an action to send a request containing time information to a transmission apparatus or a router, which is monitored using a ping, that is, an echo message of ICMP and monitor a connection of a node to be monitored and a response time in accordance with a response to the request. A polling (malfunction information gathering) is an action to gather information such as warning information or performance information of the transmission apparatuses and the routers.

Figure 3A:
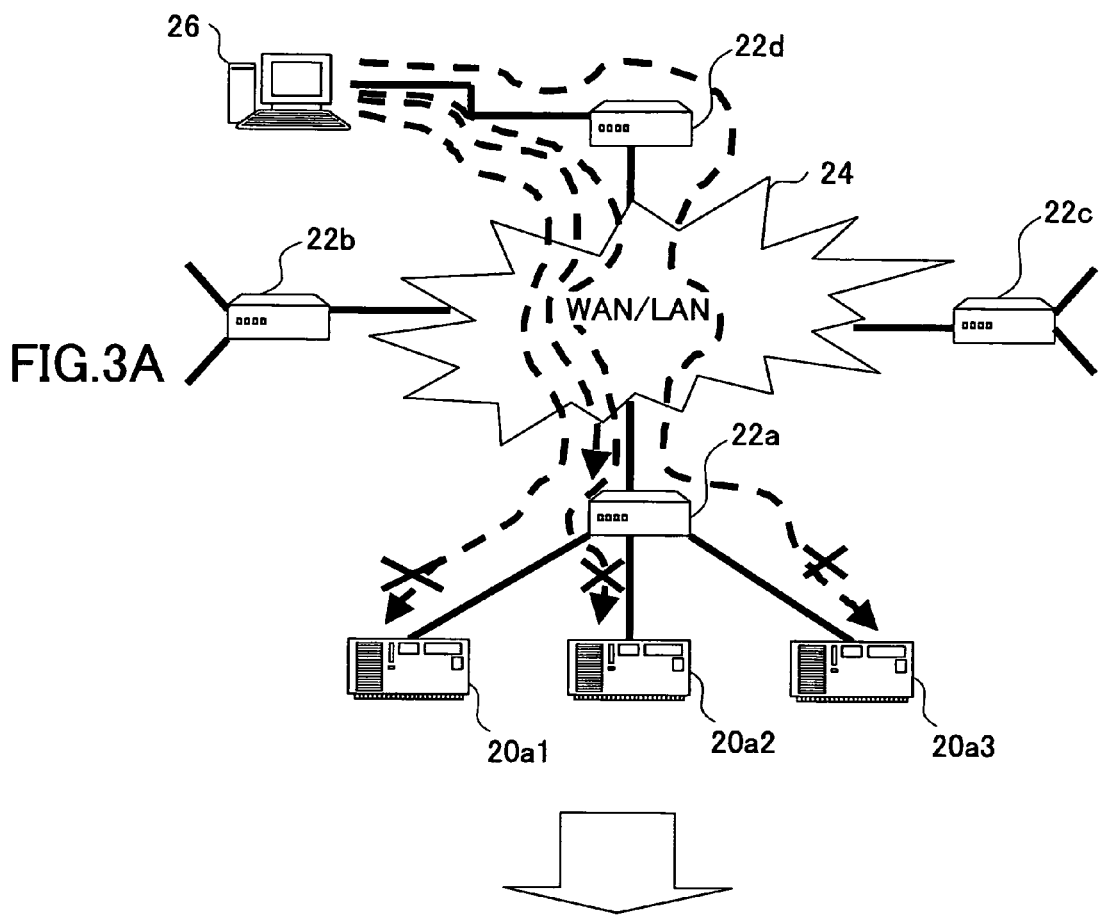
FIGS. 3A and 3B are illustrations for explaining a principle of the present invention.
Figure 3B:
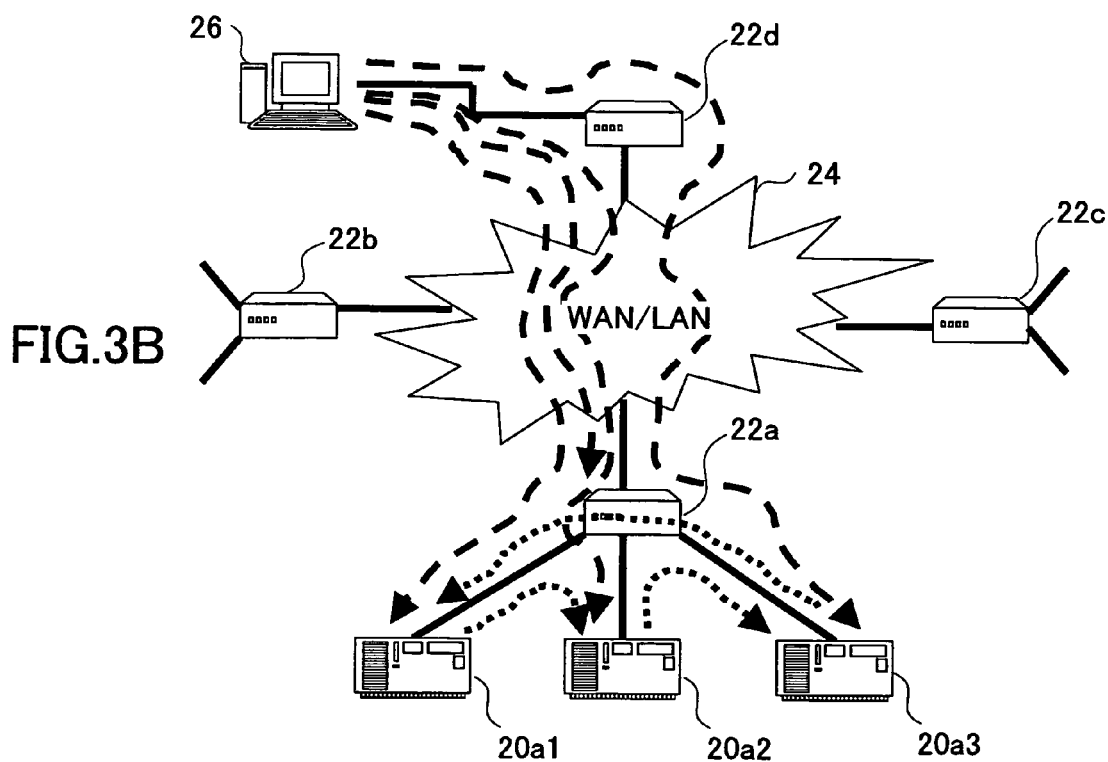

(2) As shown in FIG. 3A, when a malfunction occurs in the router $22a$ at the end of the monitoring network 24, the health check or polling performed on the transmission apparatuses $20a1$, $20a2$ and $20a3$ managed by the router $22a$ by the operation system 26 is stopped. After the malfunction of the router $22a$ is recovered, as shown in FIG. 3B, the health check or the polling performed on the transmission apparatuses $20a1$, $20a2$ and $20a3$, which are managed by the router $22a$, by the operation system 26 is resumed.

Figure 4A:
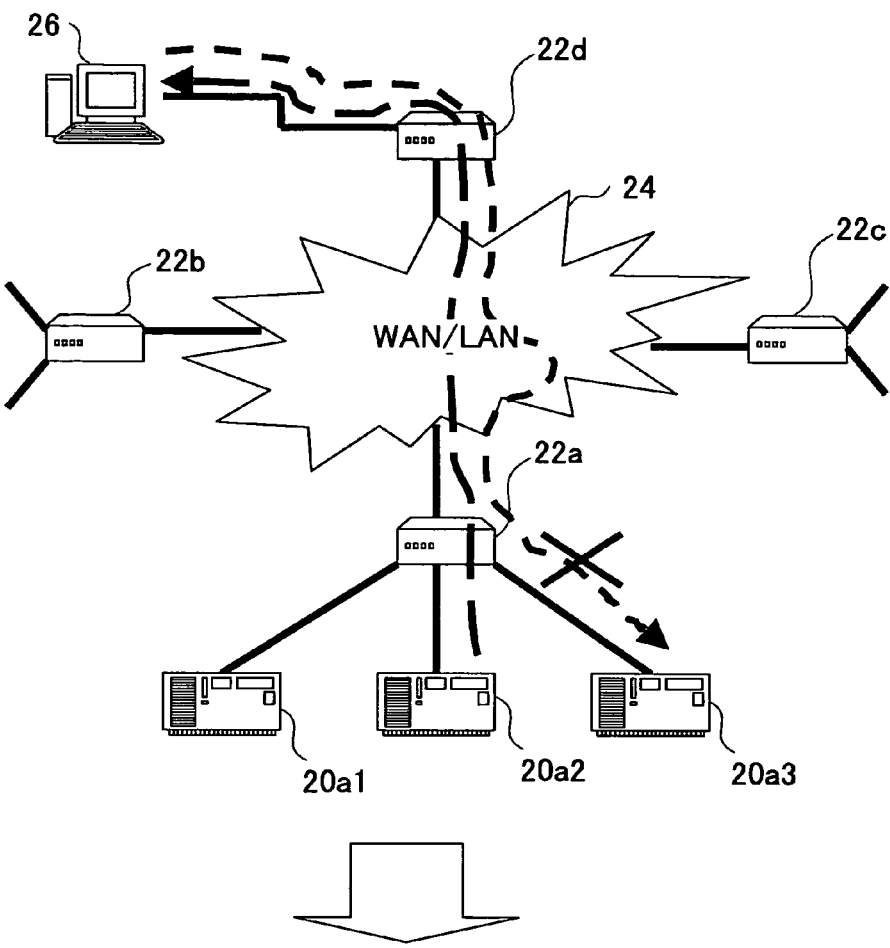
FIGS. 4A and 4B are illustrations for explaining a principle of the present invention.
Figure 4B:
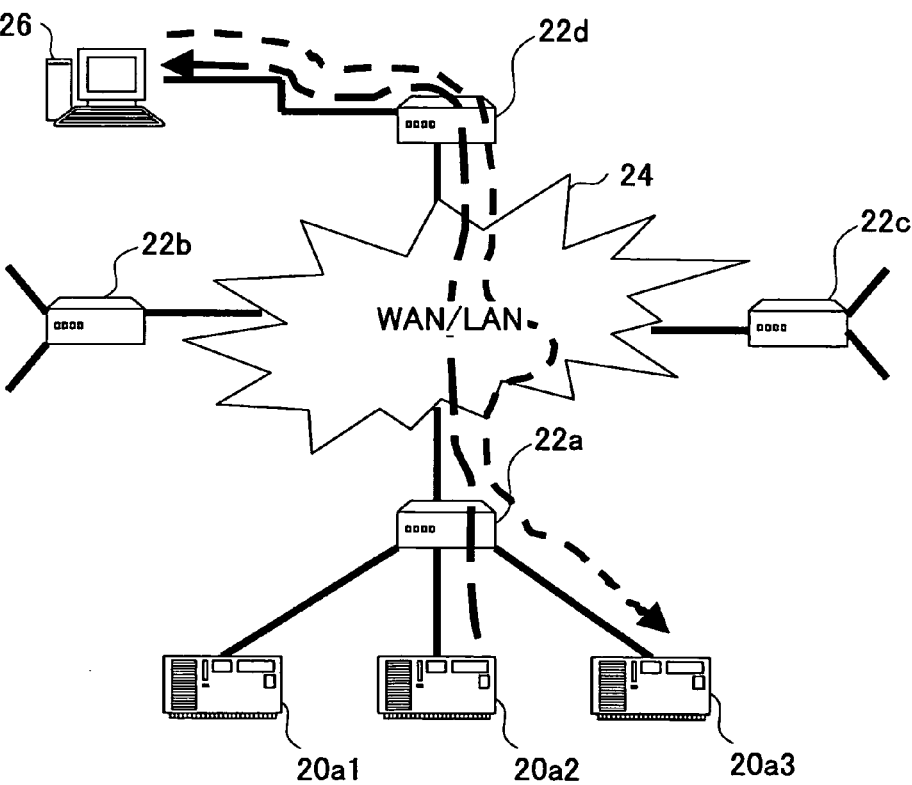

(3) As shown in FIG. 4A, when a malfunction occurs in the transmission apparatus $20a3$, the transmission apparatus $20a2$, which monitors the transmission apparatus $20a3$, sends a trap to the operation system so as to stop the health check or the polling performed on the transmission apparatus 20a3 by the operation system so that the health check is performed only between the transmission apparatuses 20a1, 30a2 and 20a 3. After the malfunction of the transmission apparatus 20a3 is recovered, as shown in FIG. 4 (B), the transmission apparatus 20a2, which has monitored the transmission apparatus 20a3 periodically sends a trap indicating the recovery of the malfunction to the operation system 26. Upon receipt of the trap, the operation system 026 requests a trap stop to the transmission apparatus 20a2, which sent the trap, so as to resume the health check or the polling performed on the transmission apparatus of which malfunction has been recovered.

Figure 5A:
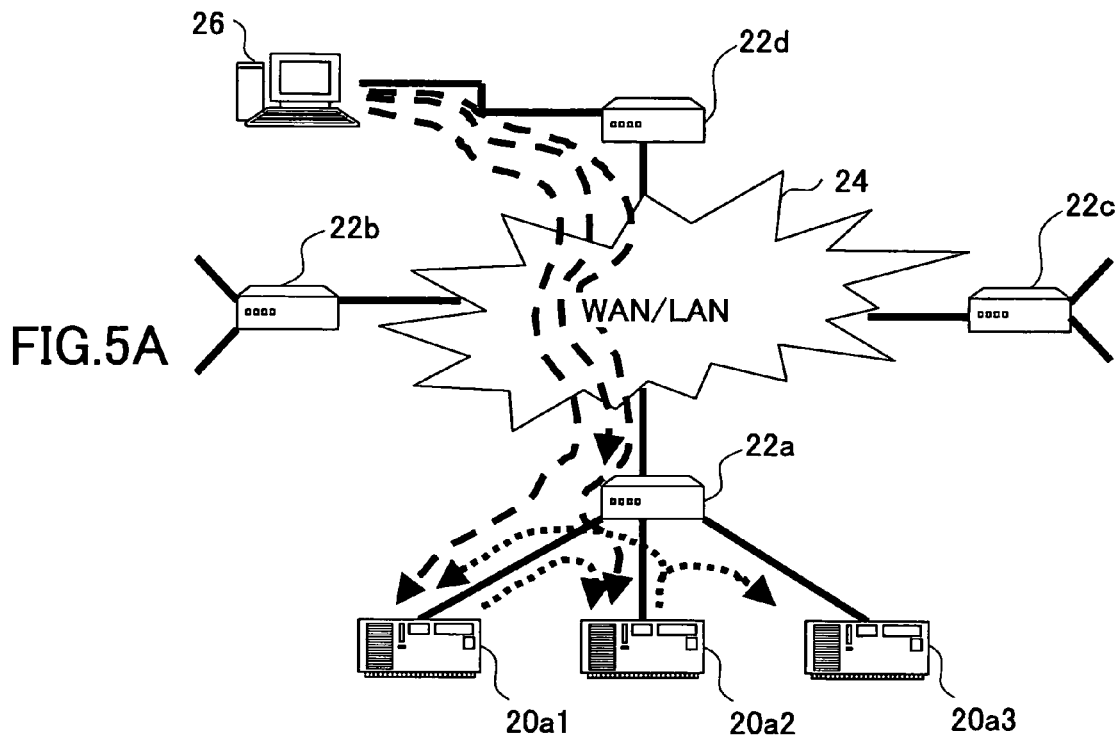
FIGS. 5A and 5B are illustrations for explaining a principle of the present invention.
Figure 5B:
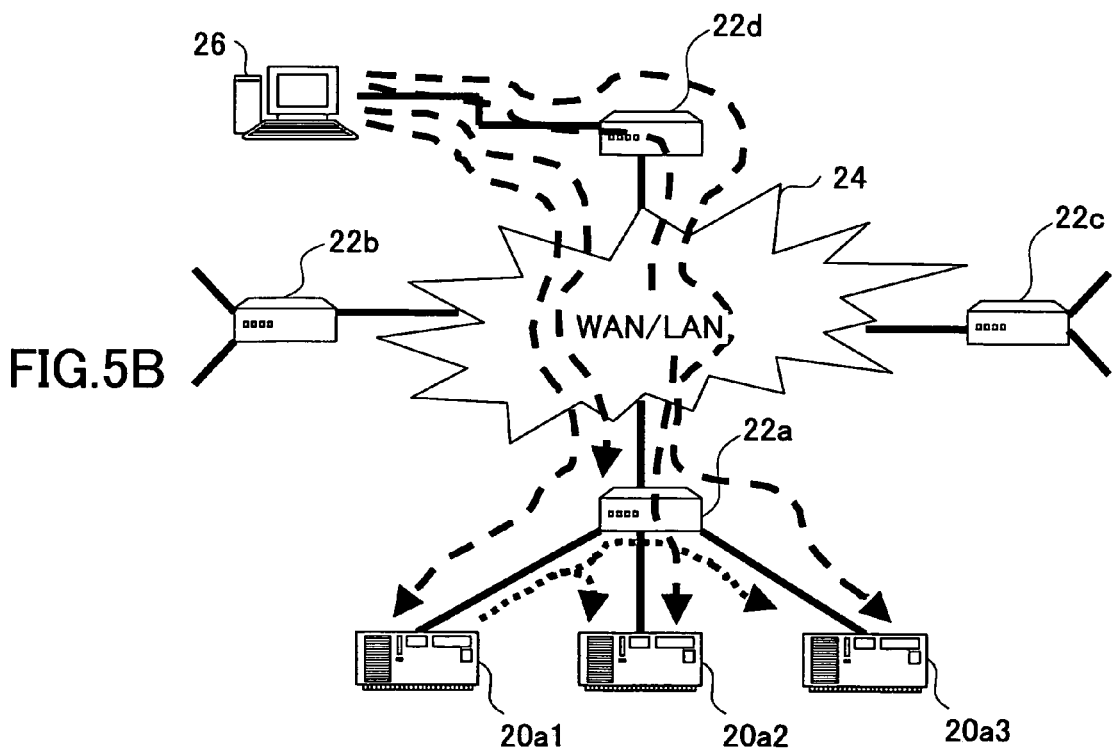

(4) As shown in FIG. 5A, when a malfunction occurs in the transmission apparatus 20a3, the transmission apparatus 20a2, which monitors the transmission apparatus 20a3, sends a trap to the operation system 26 to a to stop the health check or the polling performed on the transmission apparatus 20a3 by the operation system 26 so that the health check is performed only between the transmission apparatuses 20a1, 20a2 and 20a3. Additionally, if it becomes a multiple malfunctioning state due to a malfunction occurring in the transmission apparatus 20a2, which monitors the transmission apparatus 20a3 having the malfunction, the transmission apparatus, which monitors the transmission apparatus 20a2, sends a trap sends a trap to the operation system 26 so that the operation system 26 resumes the health check on only the transmission apparatuses 20a2 and 20a3, which are in the multiple malfunctioning state (the polling remains in stop). This is because the mutual monitoring cannot be performed due to malfunctions occurring in two transmission apparatuses among three transmission apparatuses.

Figure 6A:
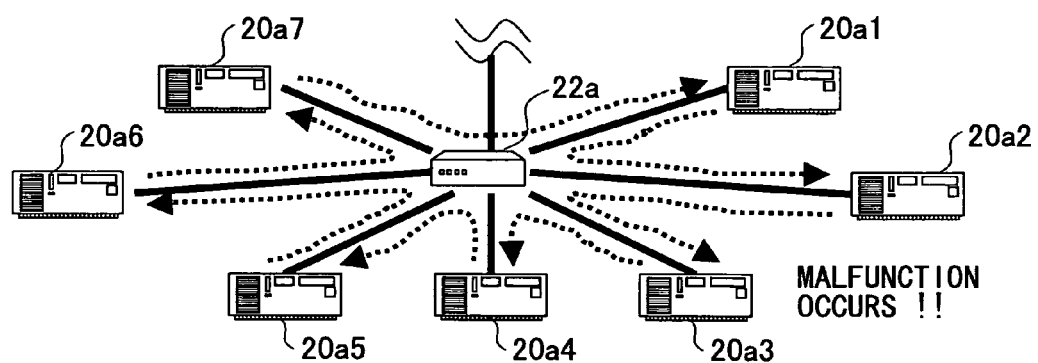
FIGS. 6A, 6B, 6C and 6D are illustrations for explaining a principle of the present invention.
Figure 6B:
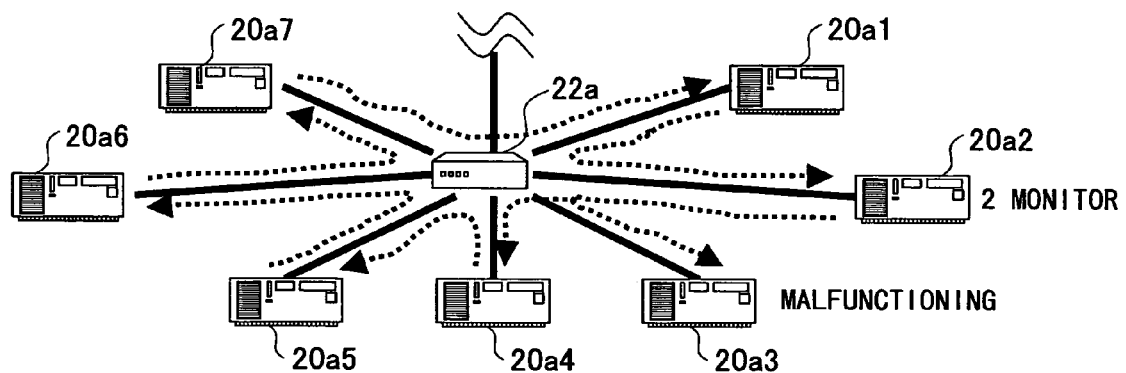
Figure 6C:
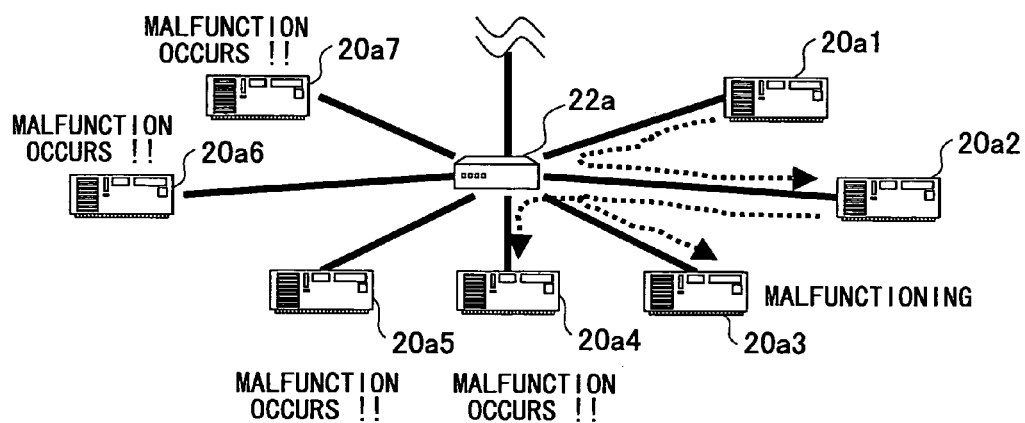

(5) As shown in FIG. 6A, the transmission apparatuses 20a1 to 20a7 managed by the router 22a at an end of the monitoring network 24 are grouped. When a malfunction occurs in one of the transmission apparatus, for example, in the transmission apparatus 20a3, as shown in FIG. 6B, the operation system automatically sets the system so that the transmission apparatus 20a4, which has been monitored by the transmission apparatus 20a3, is monitored by another transmission apparatus, for example, the transmission apparatus 20a2 in the same group. In this case, the transmission apparatus 20a2 performs a health check on the transmission apparatuses 20a3 and 20a4.

Figure 6D:
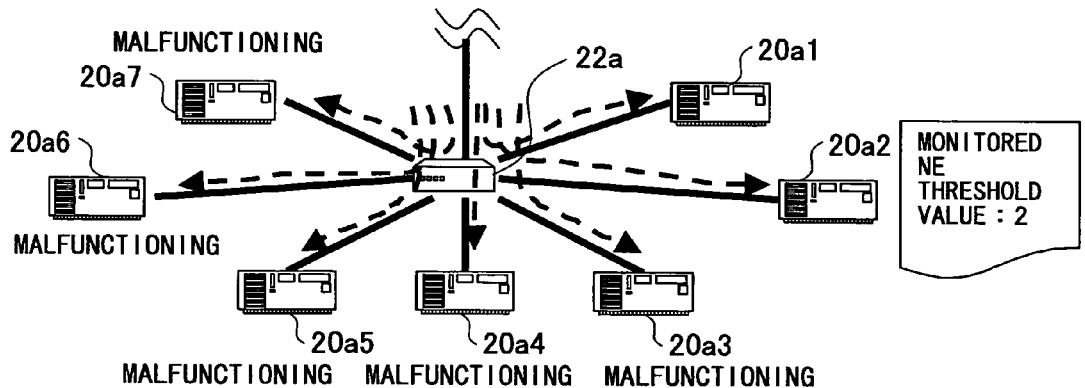

If a number of transmission apparatuses monitored by the transmission apparatus 20a exceeds a predetermined threshold value (for example, 2) due to multiple malfunction of the transmission apparatuses 20a3, 20a4, 20a5, 20a6 and 20a7 as shown in FIG. 6, the health check on the transmission apparatuses 20a1 to 20a7 is resumed by the operation system 26 as shown in FIG. 6D. According to the above-mentioned means, even if the health check or the polling from the operation system to the transmission apparatuses, a load applied to the monitoring network 24 due to the health check or the polling from the operation system 26 can be reduced by performing the health check between the transmission apparatuses 20a1 to 20a7 without decreasing the frequency of malfunction detection.

Figure 7:
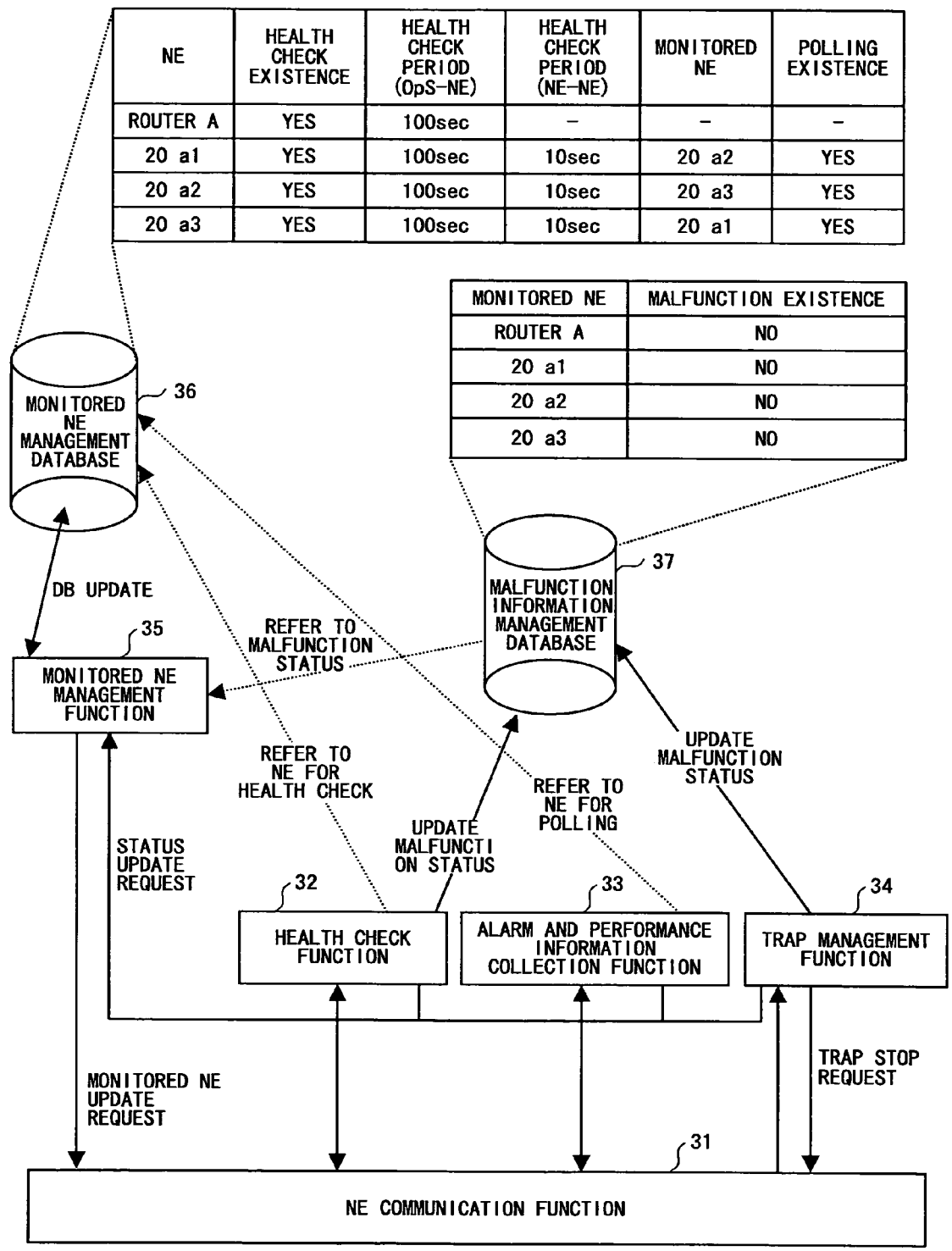
FIG. 7 is a block diagram of a function of an operation system according to the present invention.

FIG. 7 is a block diagram of a function of the operation system according to an embodiment of the present invention. In FIG. 7, an NE communication function 31 performs communication with a transmission apparatus. A health check function 32 checks a status of a transmission apparatus to be monitored (hereinafter, referred to as monitored transmission apparatus) by using a ping to the monitored transmission apparatus. The monitored transmission apparatus to which a ping is issued and a period for issuing the ping are determined by referring to a monitored NE management database 36. Moreover, information regarding occurrence/recovery of a malfunction of the transmission apparatus detected by the ping is stored in a malfunction information management database 37.

An alarm and performance information collection function 33 periodically collects (by polling) MIB (management information base) information such as an alarm and performance information retained by monitored transmission apparatus. The transmission apparatuses for polling are determined by referring to the monitored NE management database 36.

The tarp management function 34 receives an SNMP (Simple Network Management Protocol) trap sent from the monitored transmission apparatus. The malfunction occurrence/recovery information of the transmission apparatus detected by the received trap is stored in the malfunction information management database 37. A trap stop request is issued to the transmission apparatus, which sent the trap.

The monitored NE management function 35 controls execution of a health check or polling to the transmission apparatuses monitored by the operation system 26. The execution condition of the health check or the polling to the transmission apparatuses is changed according to, as a trigger, a status update request of the health check function 32, the alarm and performance information collection function 33 and the trap management function 34, and the contents thereof is written in the monitored NE management database 36. When there is a change in the contents of the health check between the transmission apparatuses, a monitored NE update request is issued to the target transmission apparatus.

The monitored NE management database 36 retains for each monitored transmission apparatus the information regarding existence of the health check, a period of a health check from the operation system to the transmission apparatus, a period of a health check between the transmission apparatuses, existence of monitored transmission apparatus and existence of polling. The contents of information retained by the monitored NE management data base 36 are updated by the monitored management function 35.

The malfunction information management database 37 retains information regarding existence of a malfunction on an individual monitored transmission apparatus basis. The contents of the information retained by the malfunction information management database 37 are updated by the trap management function 34.

Figure 8:
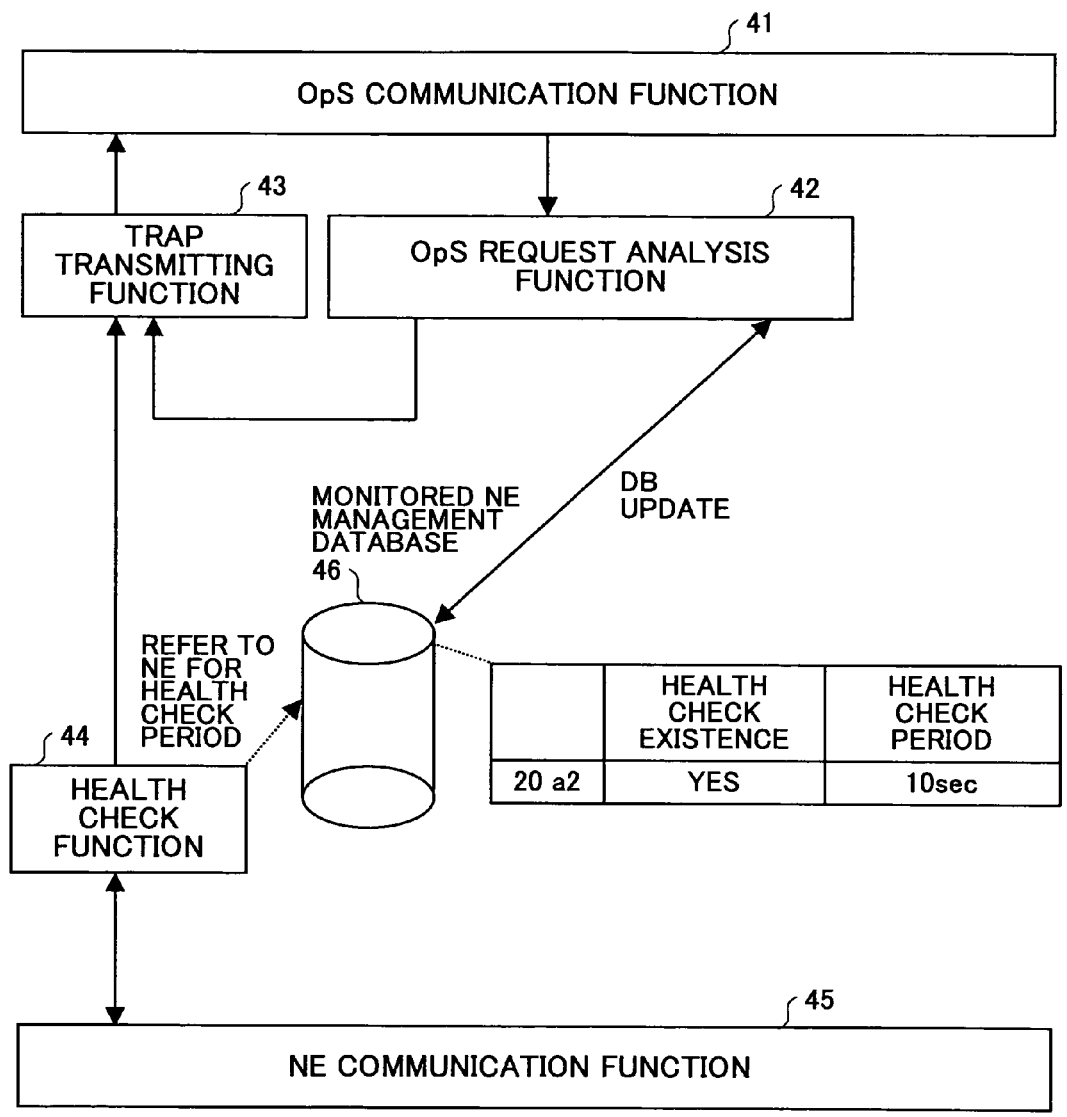
FIG. 8 is a block diagram of a function of a transmission apparatus according the present invention.

FIG. 8 is a block diagram of a function of the transmission apparatus according to an embodiment of the present invention. In FIG. 8, an OpS communication function 41 performs communication with the operation system 26. An OpS request analysis function 42 analyzes an SNMP request from the operation system 26. When a trap stop request is received, a notification is sent to a trap transmitting function 43. When a monitored NE updated request is received, a notification of the contents of the update is sent to a monitored NE management database 46.

The trap transmission function 43 issues as an SNMP trap the malfunction occurrence/recovery information of the transmission apparatus detected by the health check performed on other transmission apparatuses. The SNMP trap continues to issue periodically the same trap until a trap stop request is received from the operation system 26.

A health check function 44 checks a status of each monitored transmission apparatus using a ping. The transmission apparatus to which the ping is issued and a period for issuing the ping are determined by referring to the monitored NE management database 46. Malfunction occurrence/recovery information of the transmission apparatus detected by ping is sent to the trap transmitting function 43.

An NE communication function 45 performs communication with other transmission apparatuses. The monitored NE management database 46 retains information regarding existence or non-existence of the health check and a period of the health check on an individual monitored transmission apparatus basis. The contents of the information retained by the monitored NE management database 46 are updated by the OpS request analysis function 42 (a monitored NE update request).

Figure 9:
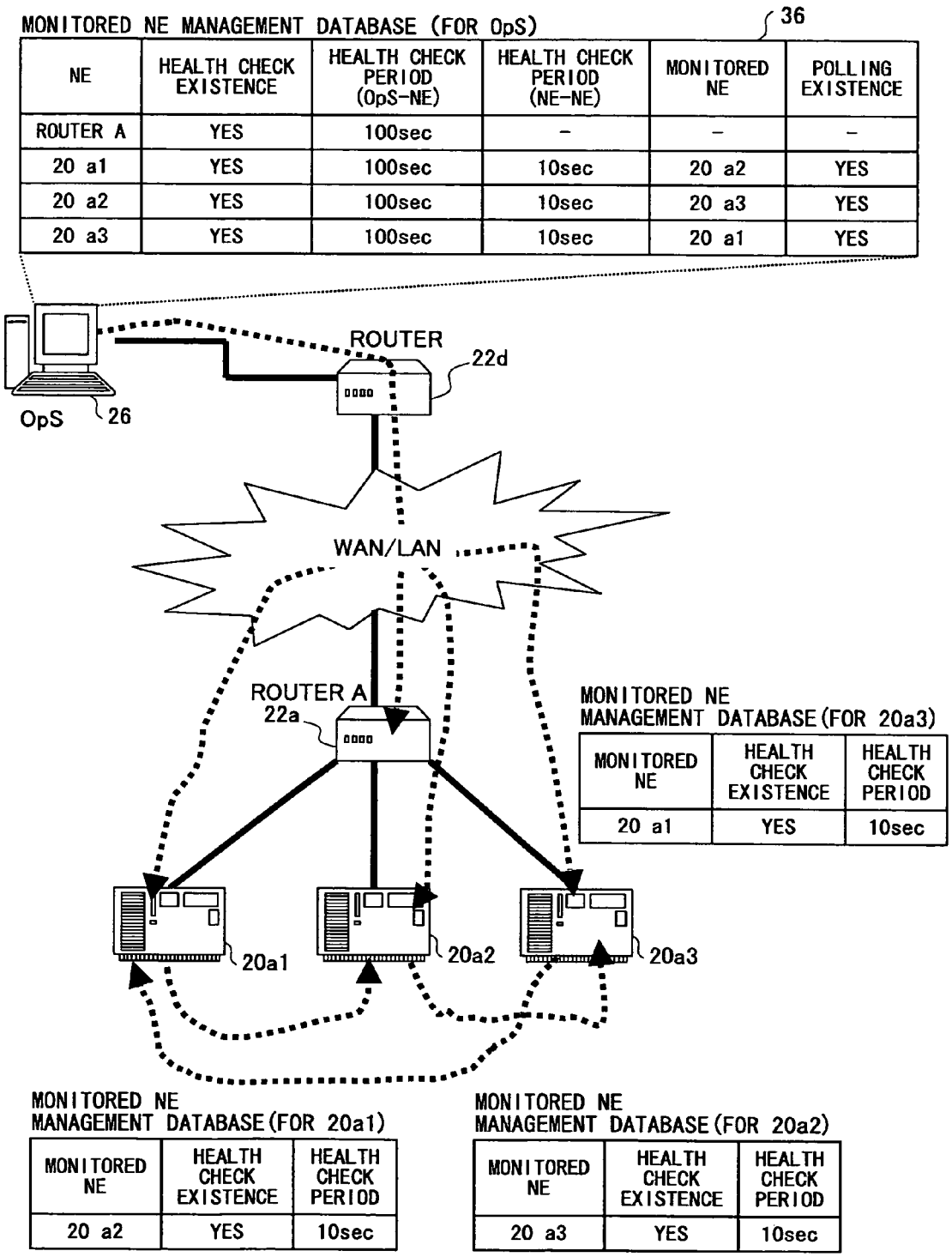
FIG. 9 is an illustration for explaining a first embodiment of the present invention.
Figure 10:
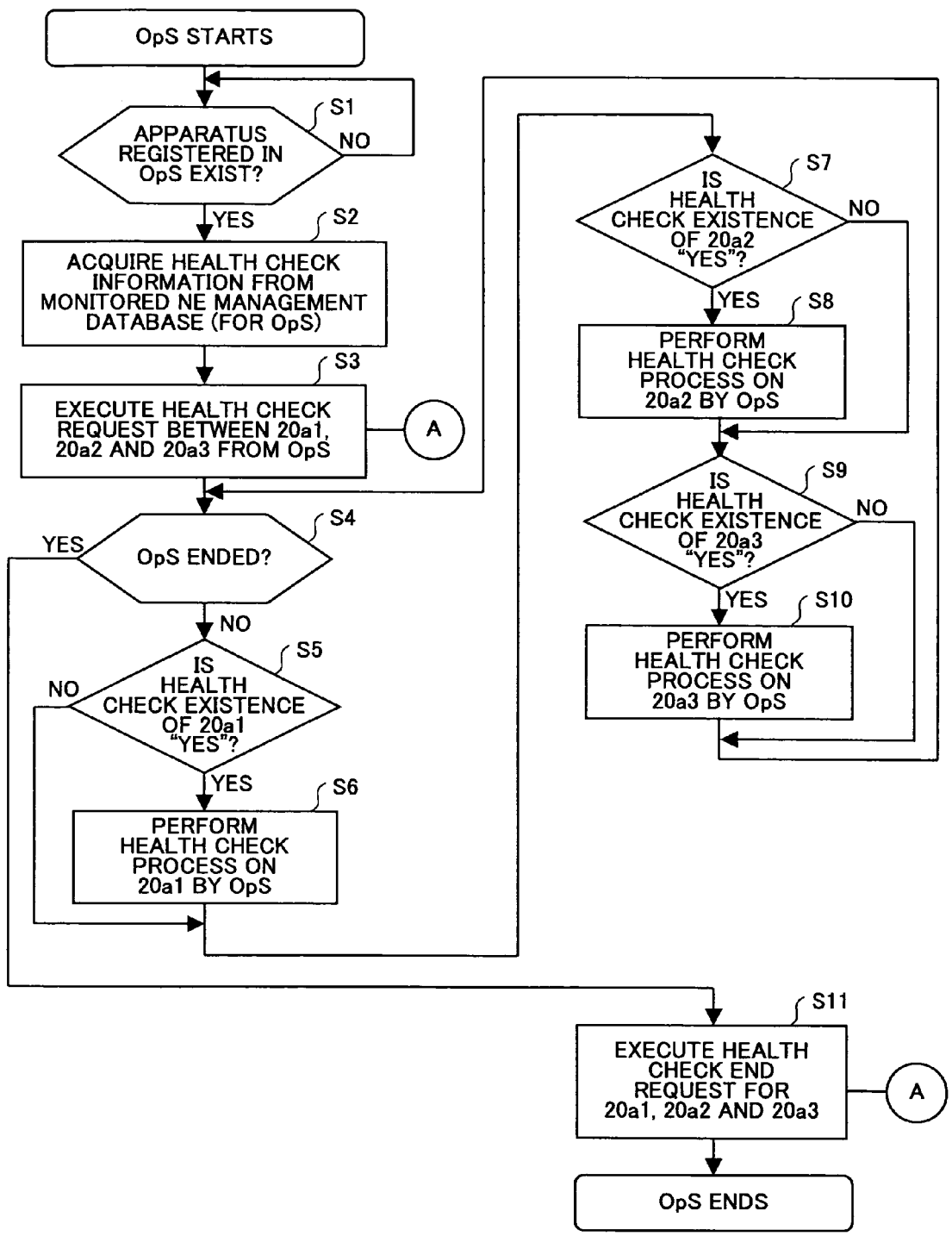
FIG. 10 is a flowchart of a part of a process performed by the operation system and the transmission apparatus according to the first embodiment of the present invention.
Figure 11:
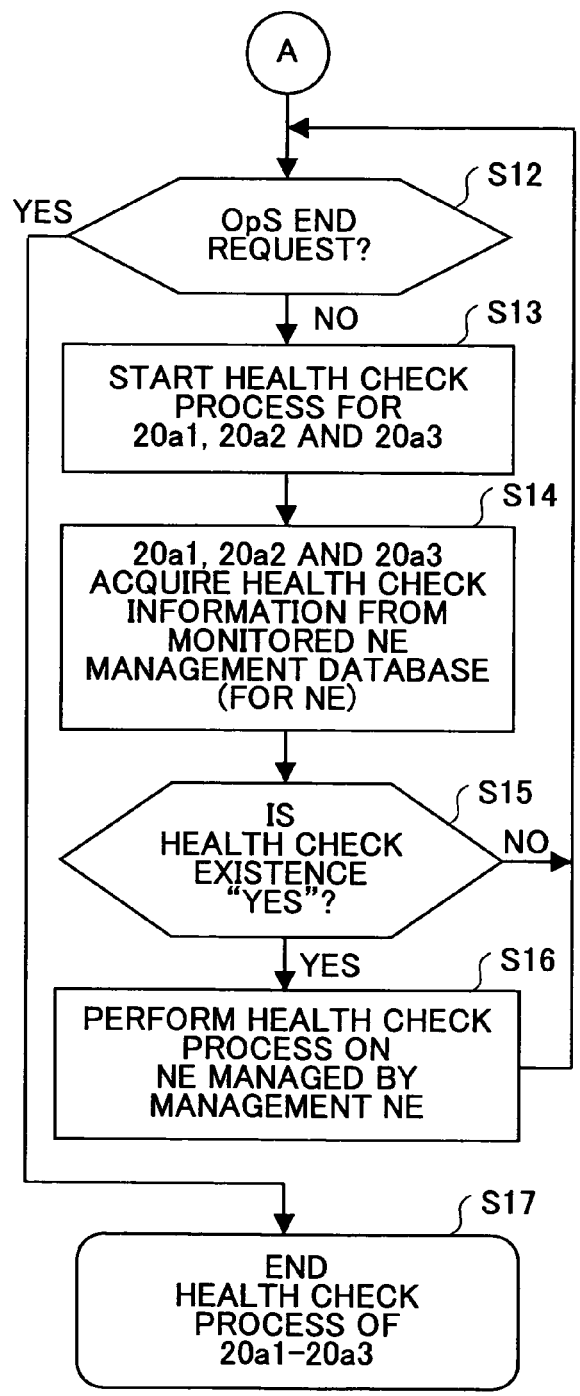
FIG. 11 is a flowchart of a part of a process performed by the operation system and the transmission apparatus according to the first embodiment of the present invention.

FIG. 9 is an illustration for explaining the first embodiment of the present invention. FIG. 10 and FIG. 11 are parts of a flowchart of a process performed by the operation system and the transmission apparatus according to the first embodiment of the present invention.

In FIG. 10, the operation system 26 determines, in step S1, whether or not there exists a router or a transmission apparatus registered in the monitored NE management database 36. If there is a registered router or transmission apparatus, the process proceeds to step S2 where the operation system 26 acquires health check information from the monitored NE management database 36. In step S3, a health check request is issued from the operation system 26 to the transmission apparatuses 20a1, 20a2 and 20a3, and the process proceeds to step S4.

In step S4, it is determined whether or not the operation system is ended. If the operation system is not ended, the process proceeds to step S5 where it is determined whether or not a health check to the transmission apparatus 20a1 is present. If there is a health check to the transmission apparatus 20a1, the process proceeds to step S6 where a health check process is performed on the transmission apparatus 20a1 by the operation system 26. Then, it is determined, in step S7, whether or not a health check to the transmission apparatus 20a2 is present. If there is a health check to the transmission apparatus 20a2, the process proceeds to step S8 where a health check process is performed on the transmission apparatus 20a2 by the operation system 26. Moreover, it is determined, in step S9, whether or not a health check to the transmission apparatus 20a3 is present. If there is a health check to the transmission apparatus 20a3, the process proceeds to step S10 where a health check process is performed on the transmission apparatus 20a3 by the operation system 26.

If it is determined, in step S4, that the operation system is ended, the process proceeds to step S11. In step S11, a health check end request between the transmission apparatuses is sent from the operation system 26 to the transmission apparatuses 20a1, 20a2 and 20a3, and the process is ended.

In FIG. 11, the transmission apparatus determines, in step S12, whether or not there is a health check request from the operation system 26. If there is not such a request, a health check process between the transmission apparatuses is started in step S13. In step S14, each of the transmission apparatuses 20a1, 20a2 and 20a3 acquires health check information from the monitored NE management database 46. Then, it is determined, in step S15, whether or not there is an existence of a health check. If no in step S15, the process returns to step S12. If there is an existence of a health check, the process proceeds to step S16 where a health check process is performed on the transmission apparatuses to be monitored, and the process returns to step S12. It should be noted that if a malfunction is detected in the transmission apparatuses monitored by the health check, an SNMP trap is sent to the operation system 26.

On the other hand, if there is a health check end request from the operation system 26 in step S12, the process proceeds to step S17 where the health check process performed on each of the transmission apparatuses 20a1, 20a2 and 20a3 is ended. That is, when performing the health check to all transmission apparatuses, the operation system 26 acquires information regarding a transmission apparatus to be applied with the health check, existence of health check and a period of health check by referring to the monitored NE management database 36 and performs the health check if it is needed. Accordingly, the period of monitoring from the operation system 26 can be changed freely by changing the health check period in the monitored NE management database 36.

The health check process between the transmission apparatuses is performed by acquiring information regarding a transmission apparatus to be applied with the health check, existence of health check and a period of health check by referring to the monitored NE management database 46. Accordingly, the period of monitoring between the transmission apparatuses can be changed freely by changing the health check period in the monitored NE management database 46.

Usually, a period of health check is updated by a monitored NE update request from the operation system 26. By setting the period (for example, 100 seconds) of the health check from the operation system 26 to a transmission apparatus shorter than the period (for example, 10 seconds) of health check between the transmission apparatuses, a load applied to the monitoring network is reduced without deteriorating accuracy of detecting a malfunction.

Figure 12:
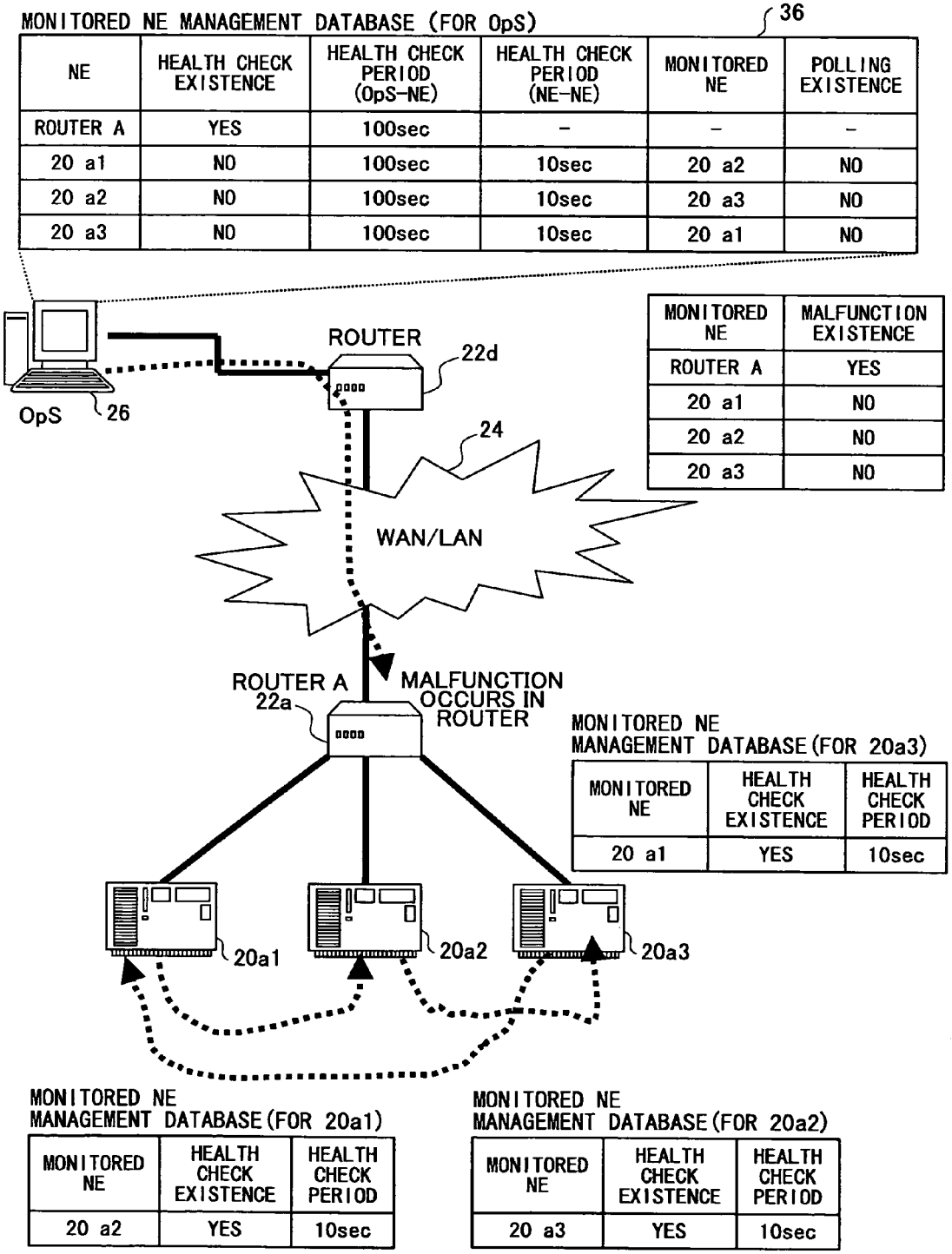
FIG. 12 is an illustration for explaining a second embodiment of the present invention.
Figure 13:
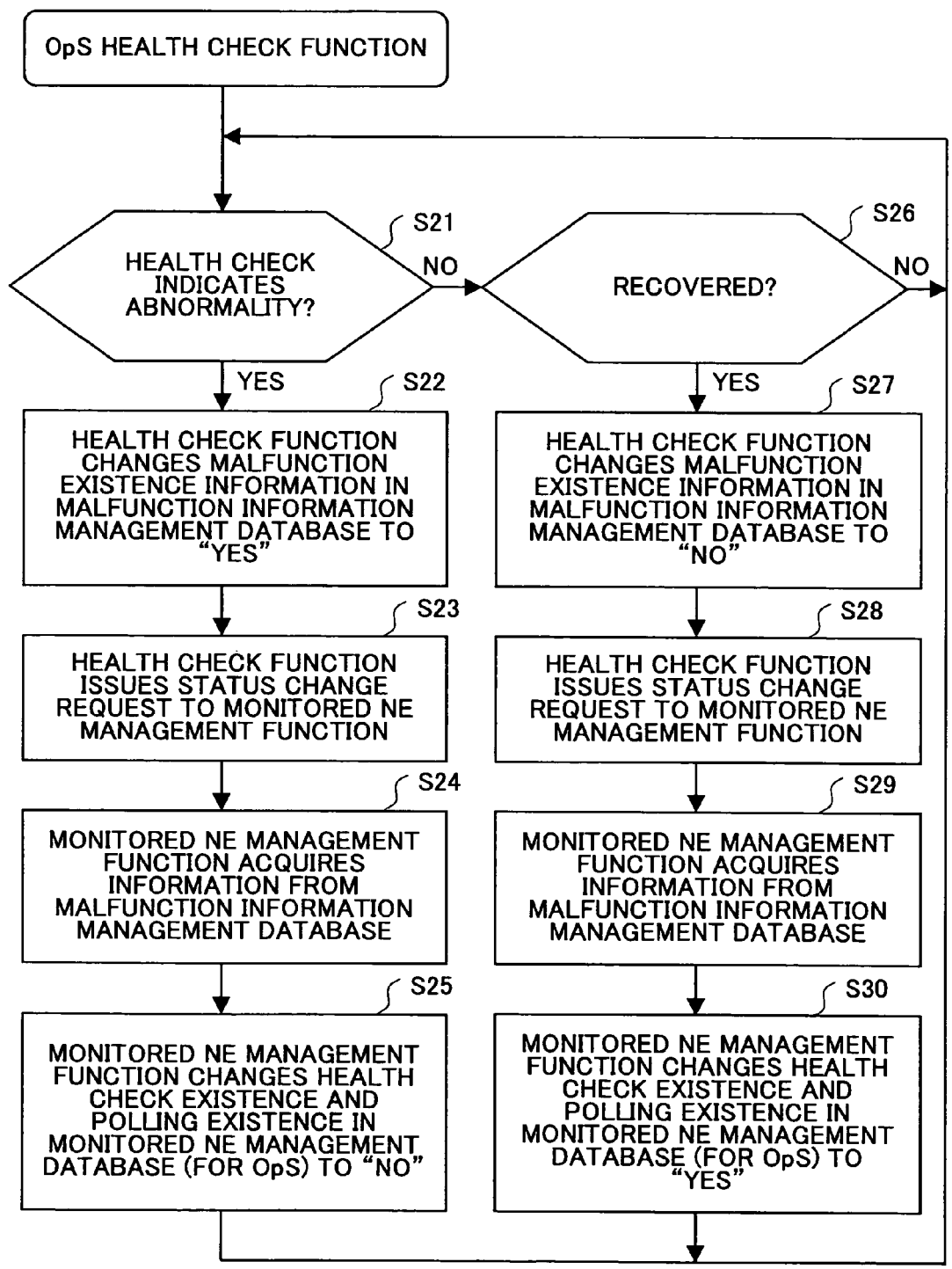
FIG. 13 is a flowchart of a process performed by a health check function.
Figure 14:
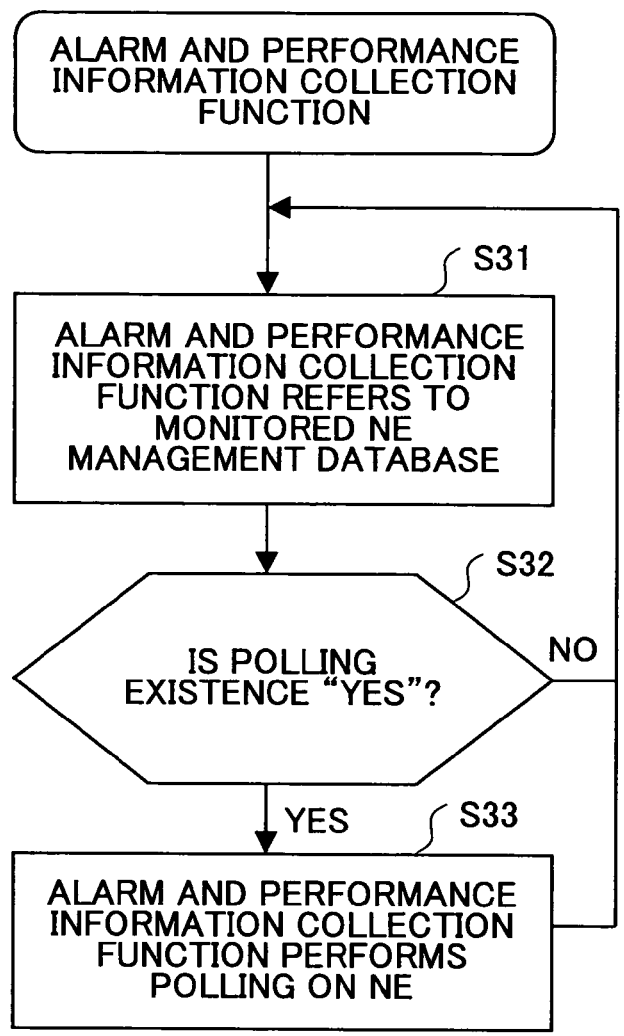
FIG. 14 is a flowchart of a process performed by an alarm and performance collection function.

FIG. 12 is an illustration for explaining a second embodiment of the present invention. FIG. 13 is a flowchart of a process performed by the health check function 32. FIG. 14 is a flowchart of a process performed by the alarm and performance collection function 33.

In FIG. 13, the health check function 32 of the operation system 26 determines, in step S21, whether or not a result of the health check indicates abnormality. If it is determined that the result of the health check indicates abnormality, the process proceeds to step S22 where the health check function 32 updates the malfunction information of the malfunction information management database 37 by changing from "NO" to "YES".

Then, in step S23, the health check function 32 issues a status change request to the monitored NE management function 35. The monitored NE management function 35 acquires, in step S24, information from the malfunction information management database 37. Then, the monitored NE management function 35 updates, in step S25, the existence of health check and the existence of polling by changing from "YES" to "NO".

On the other hand, if it is determined, in step S21, that there is no abnormality in the result of the health check, the process proceeds to step S26 where it is determined whether or not the malfunction is recovered. If it is recovered, the process proceeds to step S27 where the health check function 32 updates the malfunction information in the malfunction information management database 37 by changing from "YES" to "NO". Then, the health check function 32 issues, in step S28, a status change request to the monitored NE management function 35. The monitored NE management function 35 acquires, in step S29, information from the malfunction information management database 37 at step S29. Then, the monitored NE management function 35 updates, in step S30, the existence of health check and the existence of polling by changing from "NO" to "YES".

In FIG. 14, the alarm and performance information collection function 33 of the operation system 26 refers to, in step S31, the monitored NE management database 36, and determines, in step S32, whether or not the polling existence information is "YES". If it is determined that the polling existence information is "YES", the process proceeds to step S33 where the alarm and performance information collection function 33 performs polling on the transmission apparatuses, and, then, the process returns to step S31. That is, when a malfunction of the router 22a is detected by the health check from the health check function 32 of the operation system 26, the malfunction information of the router 22a in the malfunction information management database 37 is updated by being changed from "NO" to "YES".

In order to update the health check and polling conditions to a transmission apparatus, a status change request is issued from the health check function 32 to the monitored NE management function 35. Upon receipt of the request, the monitored NE management function 35 recognizes the malfunction of the router 22a by referring to the malfunction information management database 37.

In order to stop the health check and the polling to the transmission apparatuses 20a1, 20a2 and 20a3 that are managed by the router 22a, the health check existence information of the transmission apparatuses 20a1, 20a2 and 20a3 managed by the monitored NE management database 36 is updated by being changed from "YES" to "NO" and also the polling existence information is updated by being changed from "YES" to "NO".

It becomes possible to stop the health check and polling by the health check function and the alarm and performance information collection function 33 referring to the monitored NE management data base 36 at a timing of a next information collection. Moreover, when the malfunction of the router 22a is recovered, it is possible to detect the recovery by a health check from the operation system to the router 22a. The malfunction information of the router 22a in the monitored information management database 37 is updated by being changed from "YES" to "NO" at the same time the malfunction occurs in the router 22a.

The health check existence information of the transmission apparatuses 20a1, 20a2 and 20a3 managed by the router 22a in the monitored NE management database 36 is updated by being changed from "NO" to "YES" so as to enable resumption of the health check and polling from the operation system 26 to the transmission apparatuses 20a1, 20a2 and 20a3.

Figure 15:
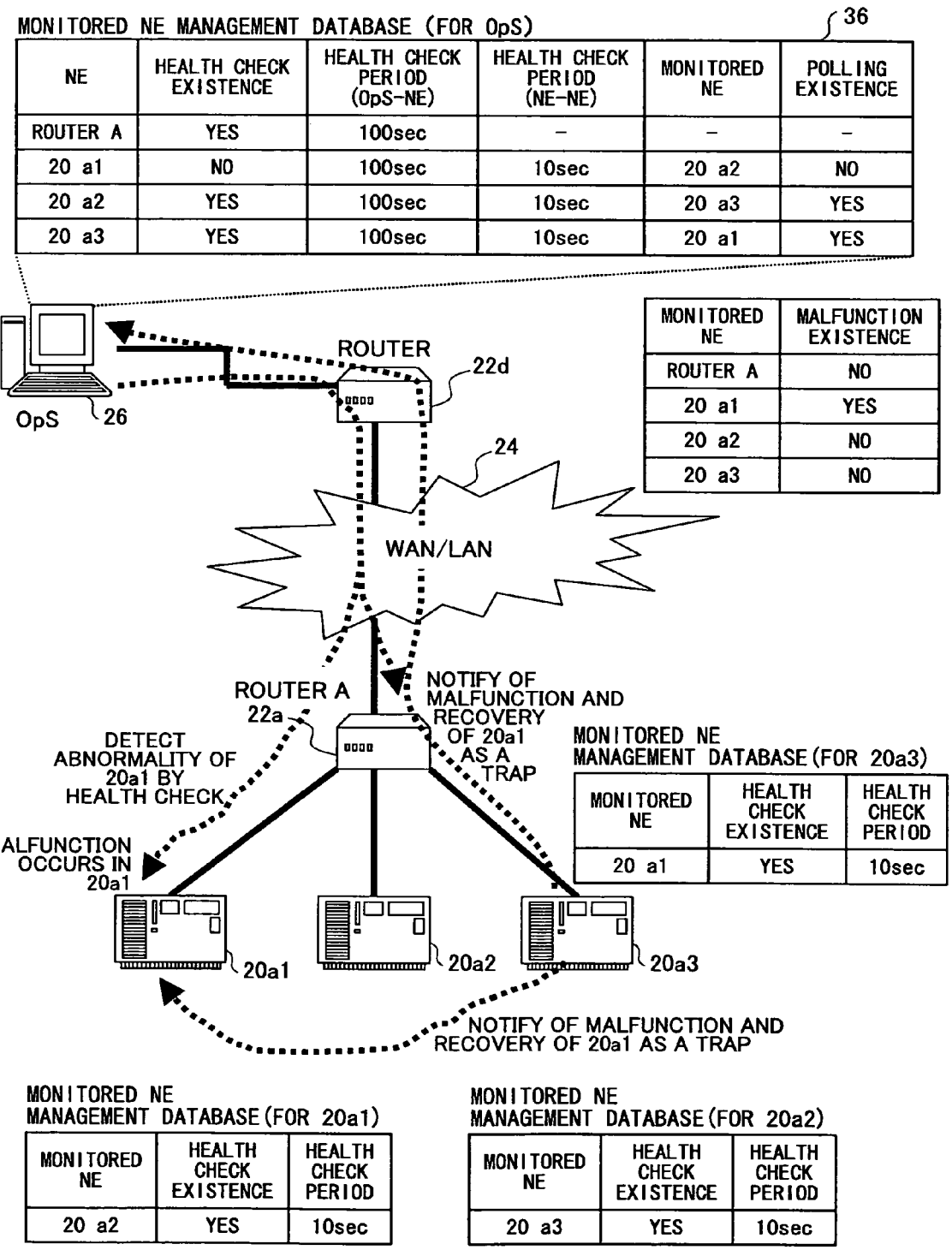
FIG. 15 is an illustration for explaining a third embodiment of the present invention.
Figure 16:
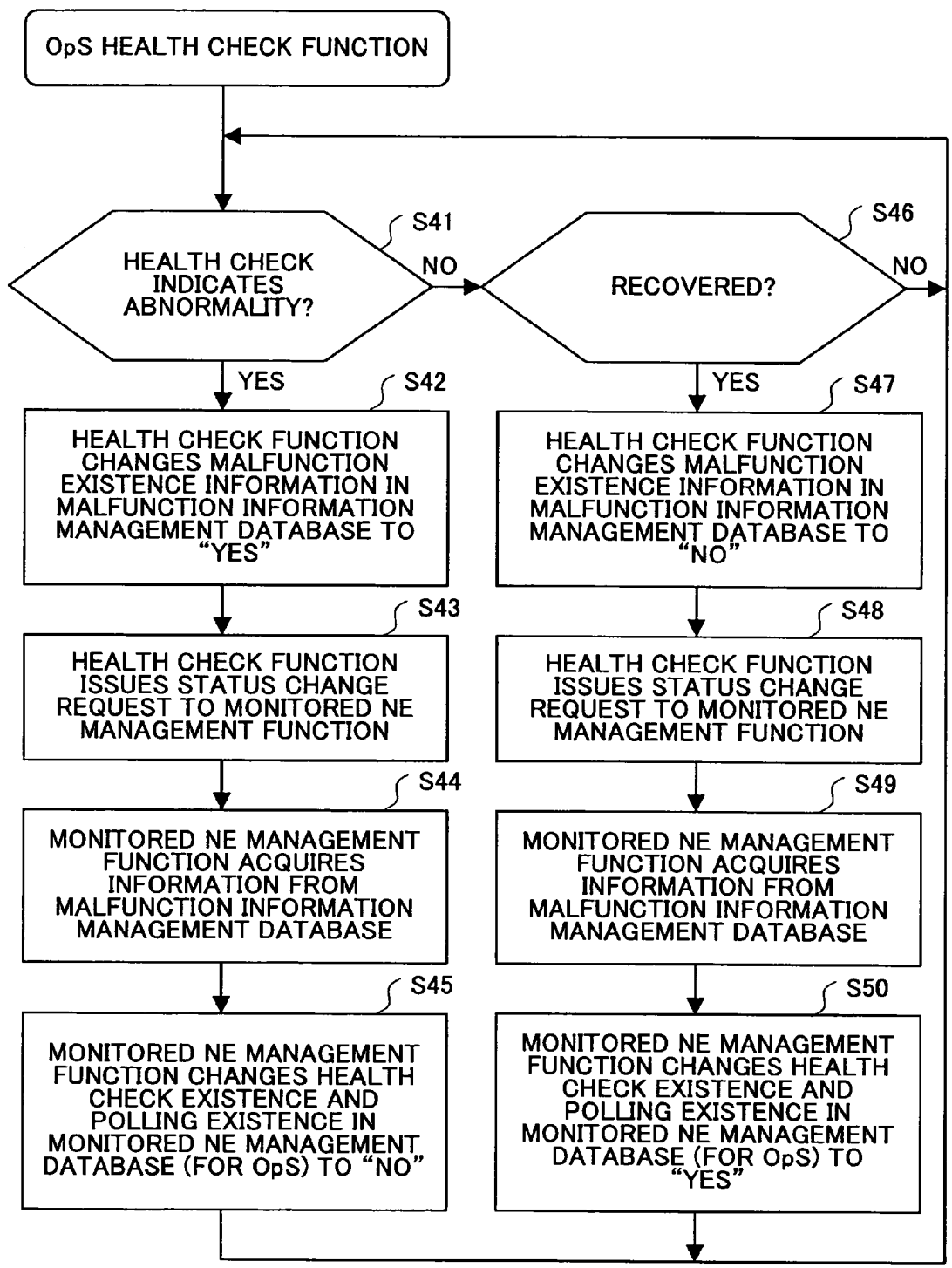
FIG. 16 is a flowchart of a process performed by the health check function.
Figure 17:
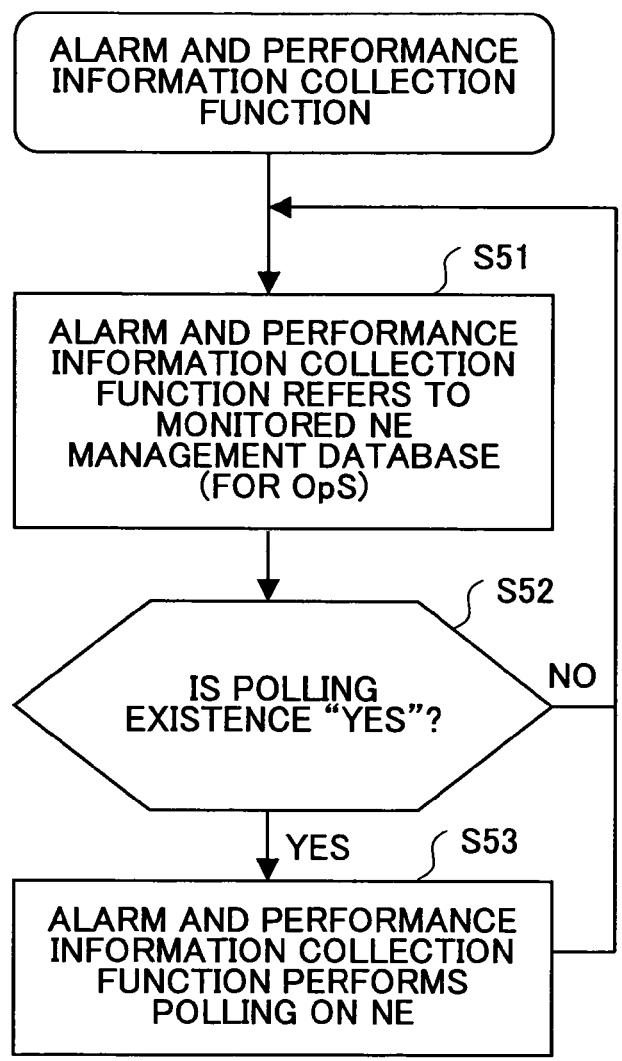
FIG. 17 is a flowchart of a process performed by the alarm and performance information collection function.
Figure 18:
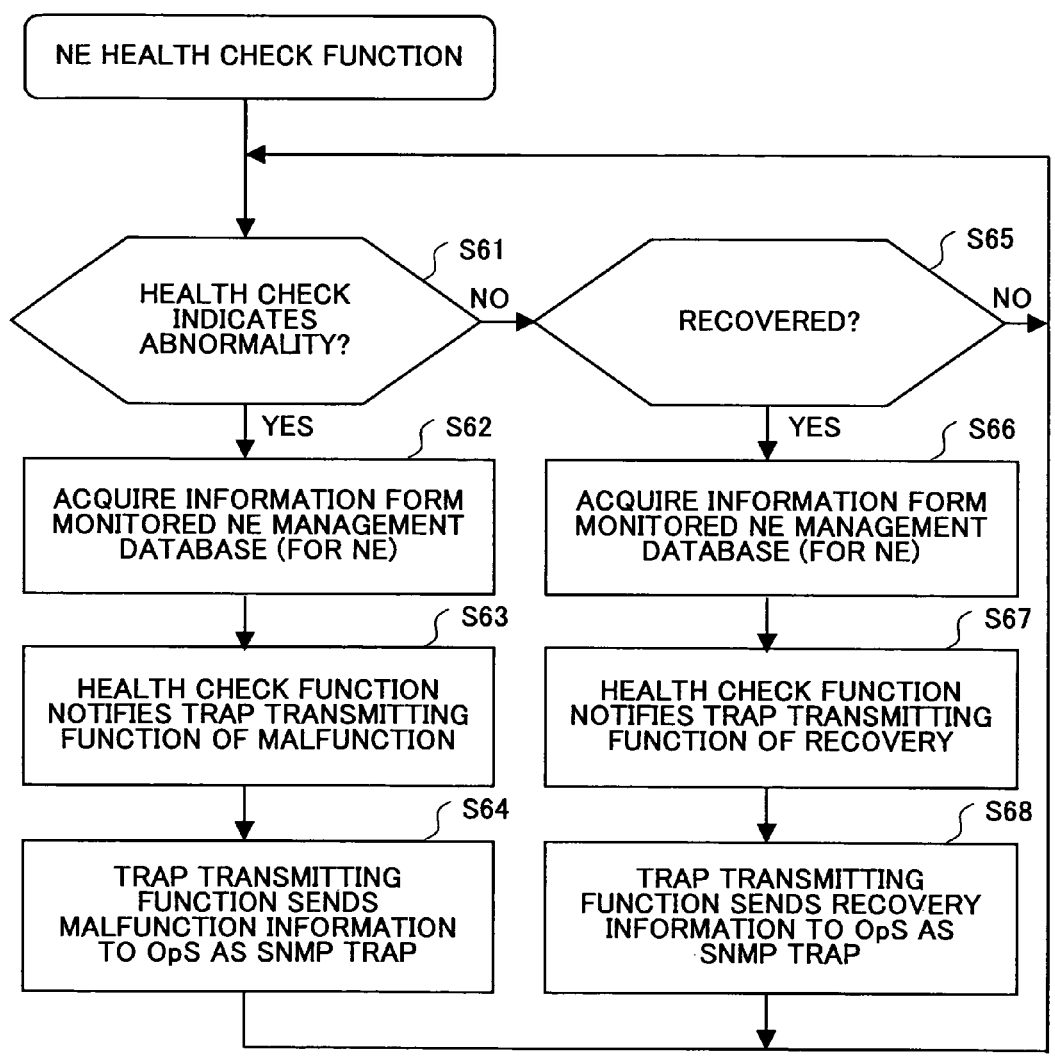
FIG. 18 is a flowchart of a process performed by the health check function.
Figure 19:
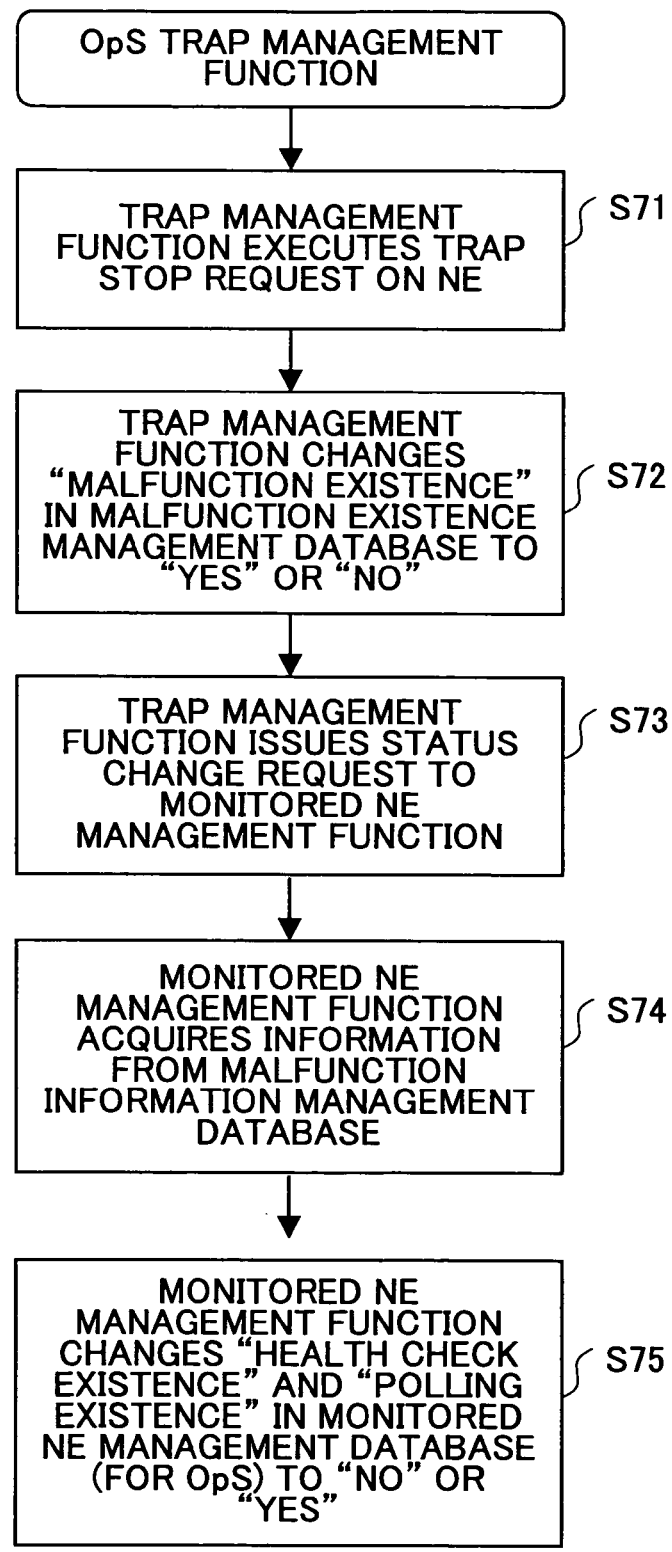
FIG. 19 is flowchart of a process performed by a trap management function.
Figure 20:
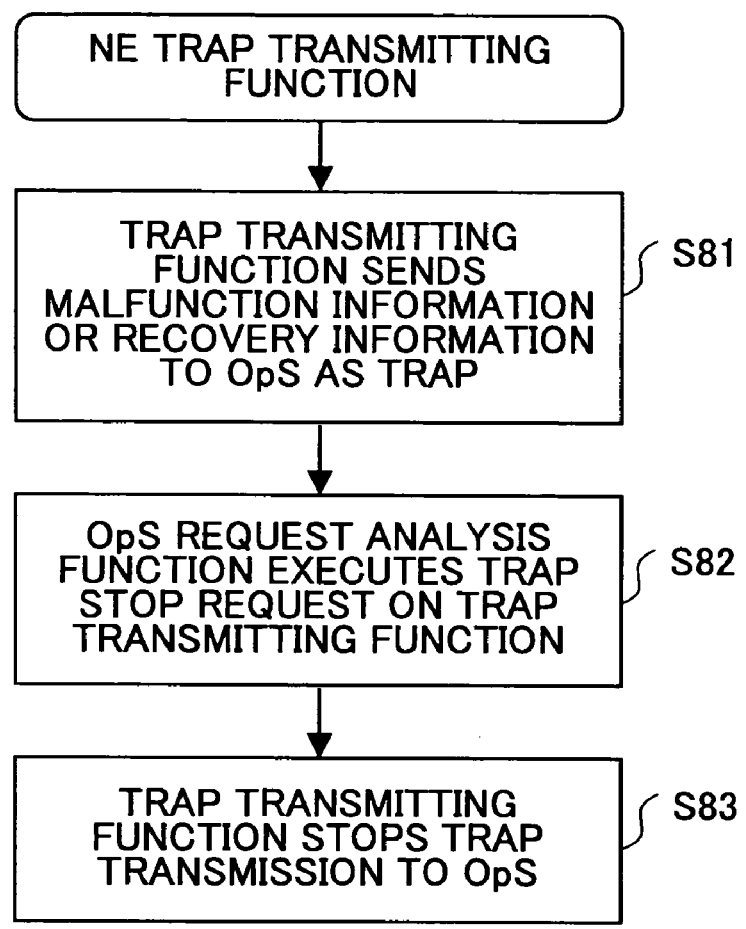
FIG. 20 is a flowchart of a process performed by a trap transmitting function.

FIG. 15 is an illustration for explaining a third embodiment of the present invention. FIG. 16 is a flowchart of a process performed by the health check function 32. FIG. 17 is a flowchart of a process performed by the alarm and performance information collection function 33. Additionally, FIG. 18 is a flowchart of a process performed by the health check function 44. FIG. 19 is flowchart of a process performed by the trap management function 34. FIG. 20 is a flowchart of a process performed by the trap transmitting function 43.

In FIG. 16, the health check function 32 of the operation system 26 determines, in step S41, whether or not a result of a health check indicates abnormality. If the result of the health check indicates abnormality, the process proceeds to step S42 where the health check function 32 updates the malfunction information of the malfunction information management database 37 by changing from "NO" to a "YES". Then, the health check function 32 issues, in step S43, a status change request to the monitored NE management function 35. The monitored NE management function 35 acquires, in step S44, information from the malfunction information management database 37. Then, the monitored NE management function 35 updates, in step S45, the health check existence and the polling existence in the malfunction information management database 37 by changing from "YES" to "NO".

On the other hand, if it is determined, in step S41, that the result does not indicate abnormality, the process proceeds to step S46 where the malfunction has been recovered. If the malfunction has been recovered, the process proceeds to step S47 where the health check function 32 updates the malfunction information of the malfunction information management database 37 by changing from "YES" to "NO". Then, the health check function 32 issues, in step S48, a status change request to the monitored NE management function 35. The monitored NE management function 35 acquires, in step S49, information from the malfunction information management database 37. Then, the monitored NE management function 35 updates, in step S50, the health check existence and the polling existence in the malfunction information management database 37 by changing from "YES" to "NO".

In FIG. 17, the alarm and performance information collection function 33 of the operation system 26 refers to, in step S51, the monitored NE management database 36, and determines, in step S52, whether or not the polling existence information is "YES". If the polling existence information is "YES", the alarm and performance information collection function 33 performs, in step S53, polling on the transmission apparatuses, and, then, the process proceeds to step S51.

In FIG. 18, the health check function 44 of the transmission apparatus determines, in step S61, whether or not a result of a health check indicates abnormality. If the result indicates abnormality, the process proceeds to step S62 where the malfunction information of the transmission apparatus detected by health check performed on other transmission apparatuses. Then, in step S63, the health check function 44 notifies the trap transmitting function 43 of the malfunction. In step S64, the trap transmitting function 43 sends the malfunction information to the operation system 26 as an SNMP trap.

On the other hand, if the result of health check does not indicate abnormality, it is determined, in step S65, whether or not the malfunction has been recovered. If the malfunction has been recovered, the process proceeds to step S66 where a health check is performed on other transmission apparatuses so as to acquire recovery information of the transmission apparatus in which the malfunction was detected. Then, in step S67, the health check function 44 notifies the trap transmitting function 43 of the recovery of the malfunction. In step S68, the trap transmitting function 43 sends the recovery information to the operation system 26 as an SNMP trap.

In FIG. 19, upon receipt of the SNMP trap, the trap management function 34 of the operation system 26 executes a trap stop request to the transmission apparatus which sent the SNMP trap in step S71. In step S72, the trap management function 34 updates the malfunction information of the malfunction information management database 37 to by changing to "YES" or "NO" according to the contents of the received SNMP trap. In step S73, the trap management function 34 issues a status change request to the monitored NE management function 35. In step S74, the monitored NE management function 35 acquires information from the malfunction information management database 37. Then, in step S75, the monitored NE management function 35 updates the health check existence information and the polling existence information in the malfunction information management database 37 by changing to "NO" or "YES" according to the contents of the SNMP trap.

In FIG. 20, the health check function 44 of a transmission apparatus notifies the operation system 26, in step S81, of the malfunction information or recovery information as an SNMP trap. Thereafter, if the trap stop request is received from the operation system 26, the OpS request analysis function 42 executes, in step S82, a trap stop request on the trap transmitting function 43. Then, in step S84, the trap transmitting function 43 stops the trap transmission to the operation system 26.

That is, when a malfunction of a transmission apparatus is detected by a health check performed by the health check function 32 of the operation system, the malfunction information in the malfunction information management data base is updated by being changed from "NO" to "YES". In order to update the conditions of execution of the health check and polling on the transmission apparatus 20a1, a state change request is issued from the health check function 32 to the monitored NE management function 35.

Upon receipt of the request, the monitored NE management function 35 refers to the malfunction information management database 37 so as to recognize the malfunction of the transmission apparatus 20a1. In order to stop the health check and polling on the transmission apparatus 20a1, the health check existence information and the polling existence information of the transmission apparatus concerned in the monitored NE management database 36 are updated by being changed from "YES" to "NO".

In the health check function and the alarm and performance information collection function 33, it becomes possible to stop execution of the health check and polling by referring to the monitored NE management database at a timing of a next information collection. When the malfunction of the transmission apparatus 20a1 is occurred or recovered, it is possible to detect the occurrence or recovery according to the health check function 44 from the from the transmission apparatus 20a3 to the transmission apparatus 20a1.

The transmission apparatus 20a3 acquires information regarding the transmission apparatus to be monitored and the health check existence information by referring to the monitored NE management database 46 in the apparatus. If an occurrence/recovery of a malfunction in the transmission apparatus 20a1 is detected as a result of the health check, the trap transmitting function is notified of the occurrence/recovery of the malfunction.

The trap transmitting function sends to the operation system 26 the occurrence/recovery information of the malfunction of the transmission apparatus 20a1 as an SNMP trap. The trap of the malfunction recovery notification of the transmission apparatus 20a1 is received by the trap management function 34 of the operation system. Upon receipt of the trap, the trap management function 34 sends a trap stop request to the transmission apparatus 20a3, which is an origin of sending the trap. Upon receipt of the trap stop request, the transmission apparatus 20a3 checks the contents of the request by the OpS request analysis function 42, and notifies the trap transmitting function 43 of the contents.

The trap transmitting function 43, at the time when the trap stop request is received, stops sending the trap of the malfunction recovery notification of the transmission apparatus 20a1 to the operation system 26. Until then, trap transmission function continues to send the trap periodically.

Upon receipt of the trap of the malfunction recovery notification of the transmission apparatus 20a1, the trap management function 34 of the operation system updates the malfunction information of the transmission apparatus 20a1 in the malfunction information management database 37 by changing from "YES" to "NO". In order to update the conditions of execution of the health check and polling, a status change request is issued from the trap management function 34 to the monitored NE management function 35. Upon receipt of the request, the monitored NE management function 35 recognizes the recovery of the malfunction of the transmission apparatus 20a1 by referring to the malfunction information management database 37.

In order to resume the health check and polling to the transmission apparatus, both the health check existence information and the polling existence information of the transmission apparatus concerned in the monitored NE management database 36 are updated by being changed from "NO" to "YES". It becomes possible to resume the health check and the polling by the health check function and the alarm and performance information collection function 73 referring to the monitored NE management database 36 at a time of next information collection.

Figure 21:
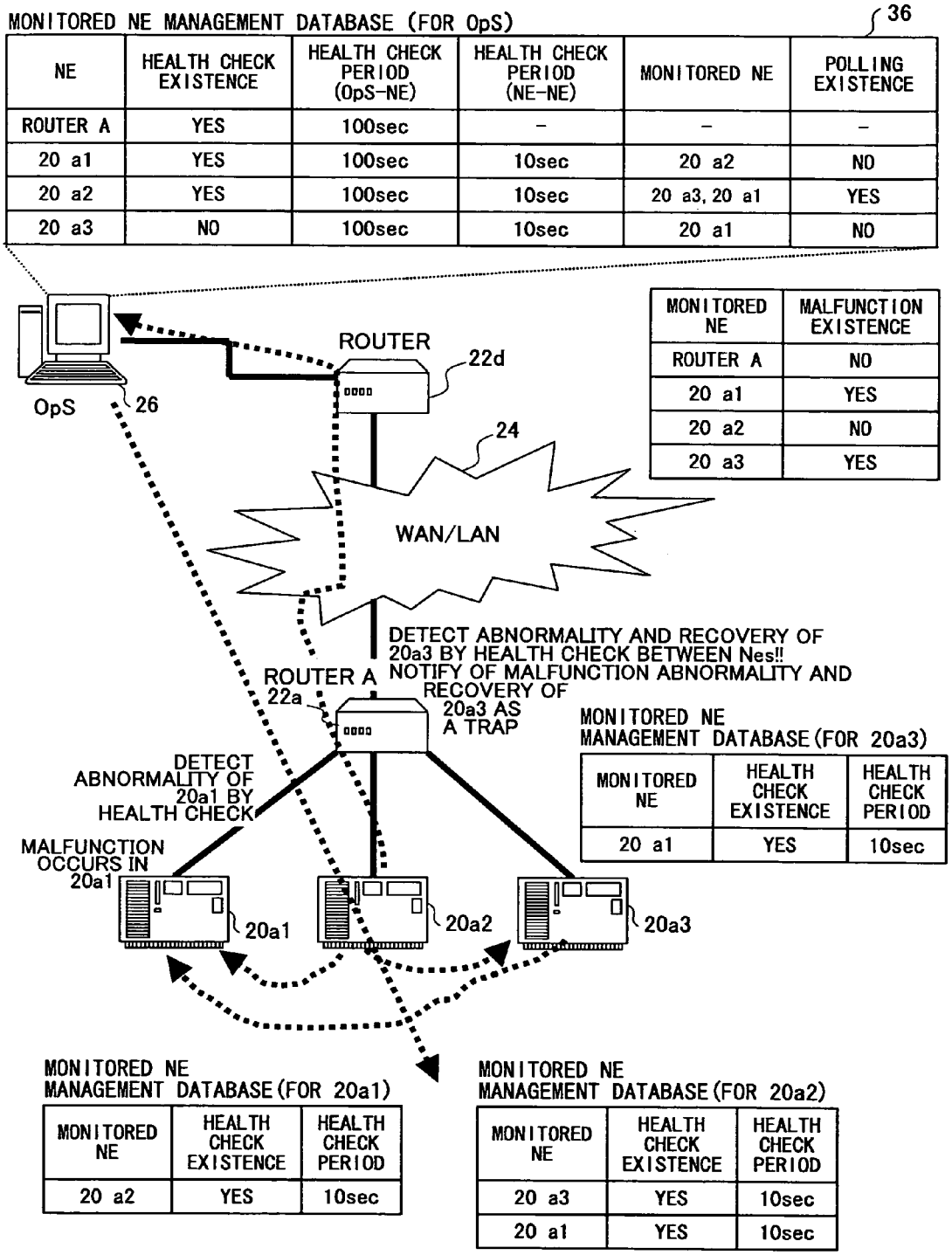
FIG. 21 is an illustration for explaining a fourth embodiment of the present invention.
Figure 22:
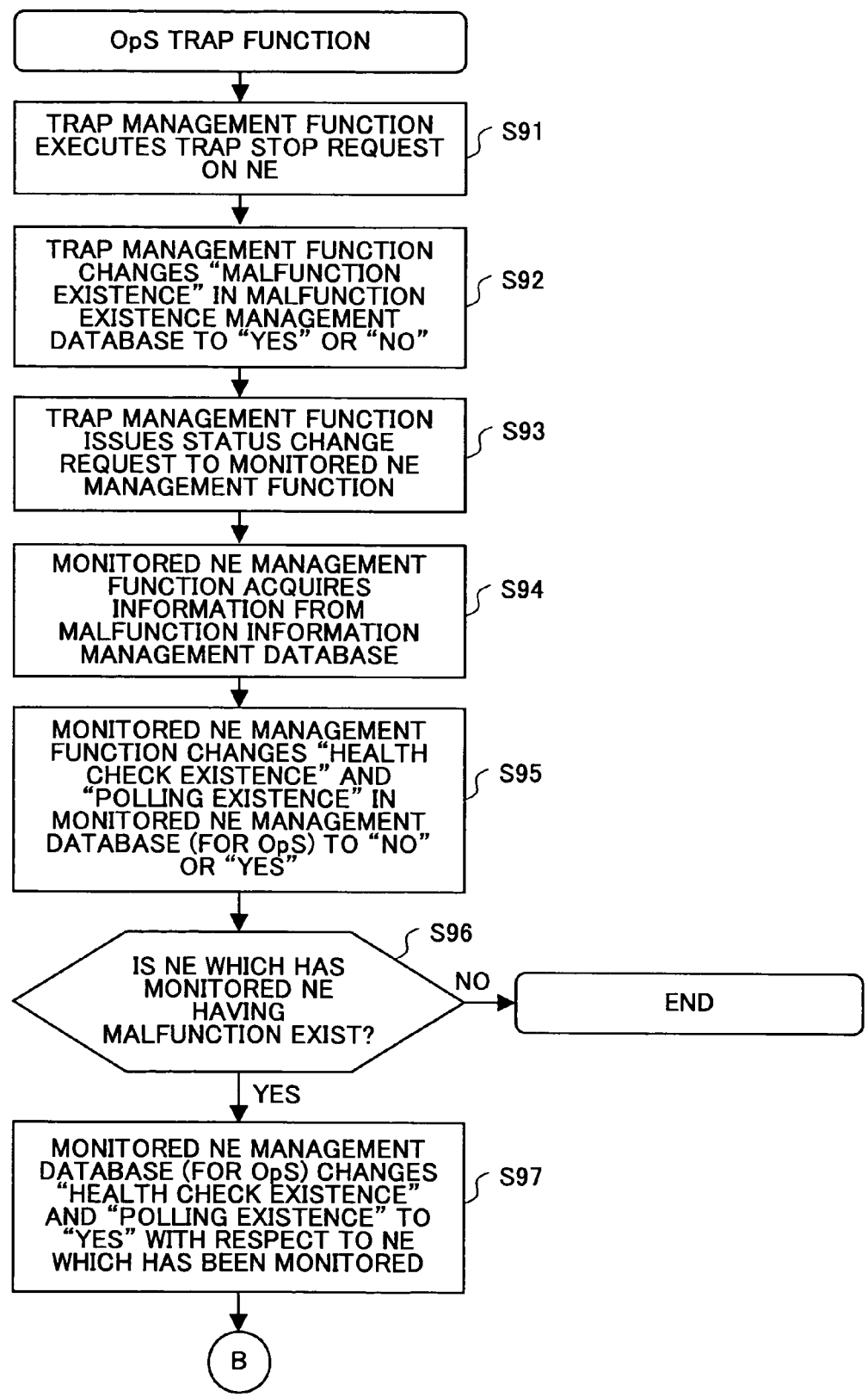
FIG. 22 is a flowchart of a part of a process performed by a trap management function.
Figure 23:
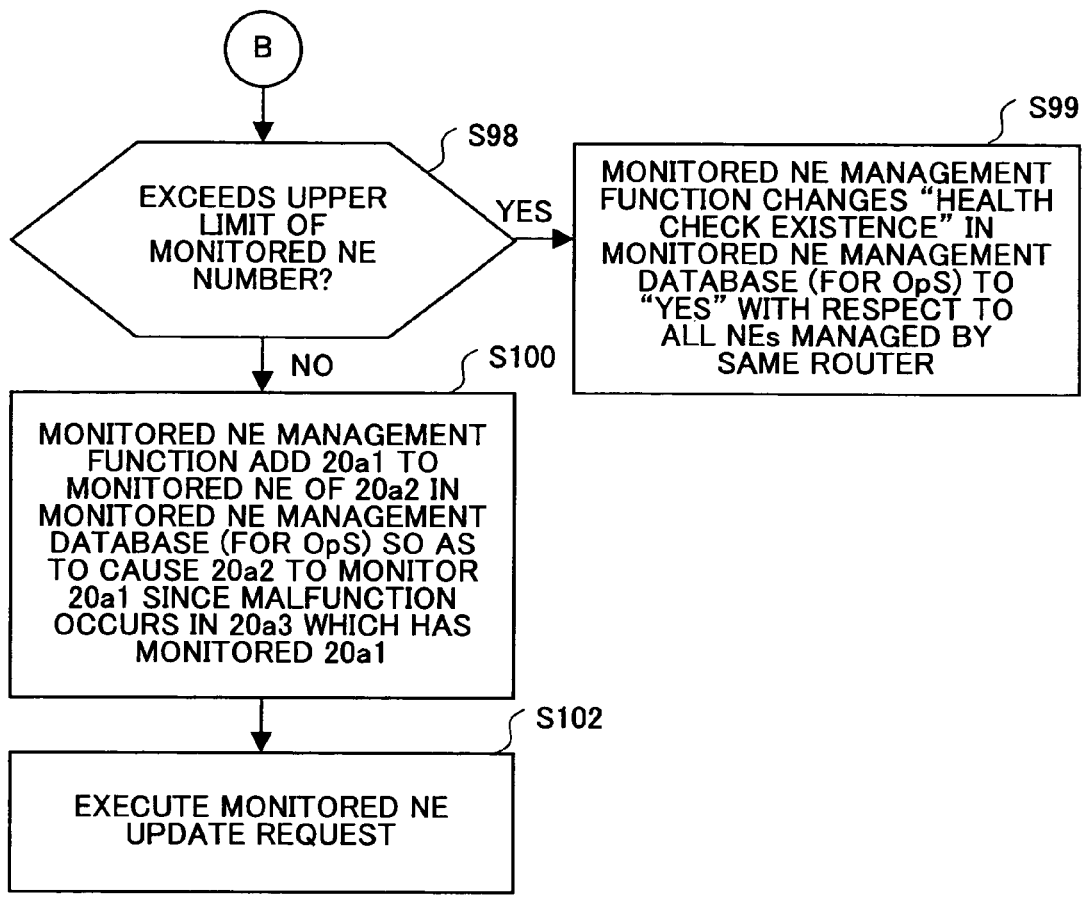
FIG. 23 is a flowchart of a part of the process performed by the trap management function.
Figure 24:
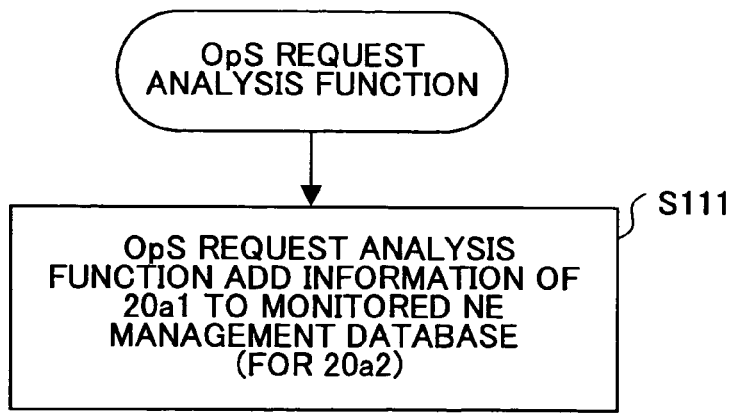
FIG. 24 is a flowchart of a process performed by an OsP request analysis function.

FIG. 21 is an illustration for explaining a fourth embodiment of the present invention. FIGS. 22 and 23 are flowcharts of parts of a process performed by the trap management function 34. FIG. 24 is a flowchart of a process performed by the OsP request analysis function 42.

In FIG. 22, upon receipt of the SNMP trap, the trap management function 34 of the operation system 26 executes a trap stop request on the transmission apparatus, which sent the SNMP trap in step S91. The trap management function 34 updates, in step S92, the malfunction information in the malfunction information management database 37 by changing to "YES" or "NO" according to the contents of the received SNMP trap. The trap management function 34 issues, in step S93, a status change request to the monitored NE management function 35. The monitored NE management function 35 acquires, in step S94, information from the malfunction information management database 37. Then, in step S95, the monitored NE management function 35 updates the health check existence information and the polling existence information in the malfunction information management database 37 by changing to "NO" or "YES" according to the contents of the SNMP trap.

If a malfunction occurs, it is determined, in step S96, whether or not there is a transmission apparatus which has been monitored by the transmission apparatus in which the malfunction has occurred. If there is such a transmission apparatus, the process proceeds to step S97 where the monitored NE management function 35 updates the health check existence information and the polling existence information of the above-mentioned monitored transmission apparatus in the malfunction information management database 37 by changing to "YES".

Next, it is determined, in step S98, whether or not a number of monitored NEs for a transmission apparatus managed by the same router in the malfunction information management database 37 exceeds a predetermined number. If it exceeds the predetermined number, the process proceeds to step S99 where the monitored NE management function 35 updates the health check existence information of the transmission apparatuses managed by the same router in the malfunction management database 37 by changing to "YES". If it does not exceeds the predetermined number, the process proceeds to step S100 where the monitored NE management function 35 adds the transmission apparatus (for example, 20a1) to the transmission apparatuses (for example, 20a2) of the monitored NE in the malfunction information management database 37 so as to cause the transmission apparatus (for example, 20a2) to perform monitoring of the transmission apparatus (for example, 20a1) since a malfunction occurs in the transmission apparatus (for example, 20a3) which has monitored the transmission apparatus (for example, 20a1). Then, the process proceeds to step S102 where a monitored NE update request is executed.

In FIG. 23, for example, the OsP request analysis function 42 of the transmission apparatus 20a2 analyzes the monitored NE update request received in step S111, and adds the information regarding the transmission apparatus (for example, 20a1) to the monitored NE management database 46. That is, when a malfunction occurs in the transmission apparatus 20a3, which is carrying out the health check on the transmission apparatus 20a1, the transmission apparatus 20a2, which is monitoring the transmission apparatus 20a3, notifies the operation system 26 of the malfunction by a trap.

As a process performed by the operation system 26, in order to resume the health check from the operation system 26 to the transmission apparatus 20a1, which has been subjected to the health check by the transmission apparatus 20a3, the health check existence information of the transmission apparatus 20a1 in the monitored NE management database 36 is updated by being changed from "NO" to "YES" by the monitored NE management function 35. Thereby, the health check by the operation system 26 can be resumed instead of malfunction monitoring by the transmission apparatus 20a3.

Since a malfunction occurred in the transmission apparatus 20a3, which had monitored the transmission apparatus 20a1, in order to cause the transmission apparatus 20a2 to monitor the transmission apparatus 20a1, the "transmission apparatus 20a2" is added to the item of monitored NE of the transmission apparatus 20a by the monitored NE management function 35. A monitored NE update request is issued so as to reflect the contents of the updated monitored NE management database 36 in the transmission apparatus 20a2. The OpS request analysis function 42 of the transmission apparatus 20a2, which received the monitored NE update request, sets the contents thereof to the monitored NE management database 46. Thereby, the health check is performed from the transmission apparatus 20a2 to the transmission apparatus 20a1.

In the above-mentioned monitored NE management function 35, when adding the monitored NE to the monitored NE management database 36, if the number of monitored NEs exceeds a predetermined upper limit of the number of monitored NEs, the addition of the monitored NE is not performed and the health check existence information in the monitored NE management database 46 is updated by being changed to "YES" with respect to all the transmission apparatuses managed by the same router so as to resume the health check by the operation system 26.

As explained above, a load to the monitoring network can be reduced without deterioration of accuracy of detecting a malfunction by performing a health check between a plurality of transmission apparatuses located close to each other within the communication network at a shorter monitoring period and performing a health check by the operation system on all of the transmission apparatus at a longer monitoring period.

It should be noted that the process of the above-mentioned step S5 serves as a first monitoring means, and the process of steps S7-S9 serves as a second monitoring means.

The present invention is not limited to the specifically disclosed embodiments, and variations and modifications may be made without departing from the scope of the present invention.

The present invention is based on Japanese priority application No. 2004-277574 filed Sep. 24, 2004, the entire contents of which are hereby incorporated herein by reference.

What is claimed is:

1. A network monitoring method for monitoring a plurality of network constituent elements that constitute a communication network by being connected to an operation system through a monitoring network, the network monitoring method comprising:

periodically performing a health check of a malfunction detection between a group of the network constituent elements positioned close to each other within said communication network at a first monitoring period; and periodically performing a health check of malfunction detection on all of the network constituent elements by said operation system at a second monitoring period longer than said first monitoring period, wherein said group of the network constituent elements positioned close to each other is a group of network constituent elements connected to a router at an end of said monitoring network, and wherein when a malfunction occurs in said router at the end of said monitoring network, said operation system stops the health check on the network constituent elements managed by said router.

2. The network monitoring method as claimed in claim 1, when the malfunction of said router at the end of said monitoring network is recovered, said operation system resumes the health check on the network constituent elements managed by said router.

3. The network monitoring method as claimed in claim 2, wherein said operation system stops the health check on one of the network constituent elements in which a malfunction occurs.

4. The network monitoring method as claimed in claim 3, wherein one of the network constituent elements, which detects a malfunction by the health check between the group of the network constituent elements, notifies said operation system of the malfunction by repeatedly sending malfunction information by a trap.

5. The network monitoring method as claimed in claim 4, wherein said operation system requests, upon receipt of said trap, a stop of sending said trap to the one of the network constituent elements which sent said trap.

6. The network monitoring method as claimed in claim 3, wherein the health check to be performed by said one of the network constituent elements in which the malfunction occurs is performed by one of the network constituent elements in the same group, which has no malfunction.

7. The network monitoring method as claimed in claim 6, wherein when a malfunction occurs in one of the group of the network constituent elements which performs the health check that was supposed to be performed by the one of the constituent elements in which the malfunction occurs, said operation system resumes the health check on the one of the network constituent elements in which the malfunction occurs.

8. The network monitoring method as claimed in claim 6, wherein when a number of the network constituent elements on which one of the constituent elements performs the health check exceeds a predetermined number, said operation system resumes the health check on all of the network constituent elements included in the same group.

9. A computer operated based on an operation system for monitoring a plurality of network constituent elements that constitute a communication network by being connected to each of the network constituent elements through a monitoring network, the operation system comprising:

a first monitoring means which causes a health check of a malfunction detection between a group of the network constituent elements positioned close to each other within said communication network at a first monitoring period; and a second monitoring means that periodically performs a health check of malfunction detection on all of the network constituent elements at a second monitoring period longer than said first monitoring period,
wherein said group of the network constituent elements positioned close to each other is a group of network constituent elements connected to a router at an end of said monitoring network, and
wherein when a malfunction occurs in said router at the end of said monitoring network, said operation system stops the health check on the network constituent elements managed by said router.

* * * * *